US011041456B2

(12) United States Patent
Dalmas, II et al.

(10) Patent No.: US 11,041,456 B2
(45) Date of Patent: Jun. 22, 2021

(54) INTERNAL COMBUSTION ENGINE

(71) Applicants: Quest Engines, LLC, Coopersburg, PA (US); Steve Blom, Oceanside, NY (US)

(72) Inventors: Elario Dino Dalmas, II, Macungie, PA (US); Roy A. Blom, Coopersburg, PA (US)

(73) Assignee: QUEST ENGINES, LLC, Coopersburg, PA (US)

(*) Notice: Subject to any disclaimer, the term of this patent is extended or adjusted under 35 U.S.C. 154(b) by 82 days.

(21) Appl. No.: 15/934,742

(22) Filed: Mar. 23, 2018

(65) Prior Publication Data
US 2018/0283312 A1 Oct. 4, 2018

Related U.S. Application Data

(63) Continuation-in-part of application No. 15/903,636, filed on Feb. 23, 2018.
(Continued)

(51) Int. Cl.
*F02F 1/18* (2006.01)
*F02M 63/00* (2006.01)
(Continued)

(52) U.S. Cl.
CPC ............. *F02F 1/183* (2013.01); *F01B 9/026* (2013.01); *F01L 1/04* (2013.01); *F01L 1/08* (2013.01);
(Continued)

(58) Field of Classification Search
CPC .. F02F 1/183; F02F 3/022; F02F 1/242; F02F 1/20; F02F 3/28; F01L 13/0047;
(Continued)

(56) References Cited

U.S. PATENT DOCUMENTS 1,016,561 A 2/1912 Grabler
1,046,359 A 12/1912 Winton
(Continued)

FOREIGN PATENT DOCUMENTS

CN 201526371 7/2010
CN 106321916 1/2017
(Continued)

OTHER PUBLICATIONS

Graunke, K. et al., "Dynamic Behavior of Labyrinth Seals in Oilfree Labyrinth-Piston Compressors" (1984). International Compressor Engineering Conference. Paper 425. http://docs.lib.purdue.edu/icec/425.
(Continued)

*Primary Examiner* — Jacob M Amick
*Assistant Examiner* — Charles J Brauch
(74) *Attorney, Agent, or Firm* — Yohannan Law; David R Yohannan

(57) ABSTRACT

Internal combustion engines having a split crankshaft are disclosed. The engines may also have non-circular, preferably rectangular, cross-section pistons and cylinders. The pistons may include a skirt with a field of pockets that provide a ringless, non-lubricated, seal equivalent. The pistons also may have a domed piston head with depressions thereon to facilitate the movement of air/charge in the cylinder. The engines also may use multi-stage poppet valves in lieu of conventional poppet valves. The engines may use the pumping motion of the engine piston to supercharge the cylinder with air/charge. The engines also may operate in an inverted orientation in which the piston is closer to the local gravitationally dominant terrestrial body's center of gravity at top dead center position than at bottom dead center position.

12 Claims, 25 Drawing Sheets

Related U.S. Application Data

(60) Provisional application No. 62/501,295, filed on May 4, 2017, provisional application No. 62/491,629, filed on Apr. 28, 2017, provisional application No. 62/479,013, filed on Mar. 30, 2017.

(51) Int. Cl.

| | |
|---|---|
| *F16C 3/10* | (2006.01) |
| *F02F 3/28* | (2006.01) |
| *F02B 75/22* | (2006.01) |
| *F02F 1/20* | (2006.01) |
| *F02F 1/24* | (2006.01) |
| *F01L 1/04* | (2006.01) |
| *F01L 13/00* | (2006.01) |
| *F01L 1/08* | (2006.01) |
| *F01L 1/18* | (2006.01) |
| *F01L 1/38* | (2006.01) |
| *F01L 1/28* | (2006.01) |
| *F02B 33/04* | (2006.01) |
| *F01L 3/20* | (2006.01) |
| *F02B 75/32* | (2006.01) |
| *F01B 9/02* | (2006.01) |
| *F02B 33/26* | (2006.01) |
| *F02F 3/02* | (2006.01) |
| *F01L 1/24* | (2006.01) |

(52) U.S. Cl.
CPC ............... *F01L 1/185* (2013.01); *F01L 1/28* (2013.01); *F01L 1/38* (2013.01); *F01L 3/205* (2013.01); *F01L 13/0031* (2013.01); *F01L 13/0047* (2013.01); *F02B 33/04* (2013.01); *F02B 75/22* (2013.01); *F02B 75/32* (2013.01); *F02F 1/20* (2013.01); *F02F 1/242* (2013.01); *F02F 3/28* (2013.01); *F02M 63/0035* (2013.01); *F16C 3/10* (2013.01); *F01L 1/2405* (2013.01); *F01L 2303/00* (2020.05); *F01L 2305/00* (2020.05); *F02B 33/26* (2013.01); *F02B 2275/30* (2013.01); *F02B 2275/40* (2013.01); *F02F 3/022* (2013.01)

(58) Field of Classification Search
CPC ......... F01L 13/0031; F01L 3/205; F01L 1/38; F01L 1/28; F01L 1/185; F01L 1/08; F01L 1/04; F01L 2105/00; F01L 2103/00; F01L 1/2405; F01B 9/026; F16C 3/10; F02M 63/0035; F02B 2275/40; F02B 2275/30; F02B 33/26; F02B 33/04; F02B 75/32; F02B 75/22
See application file for complete search history.

(56) References Cited

U.S. PATENT DOCUMENTS

| | | | |
|---|---|---|---|
| 1,329,559 A | 2/1920 | Tesla | |
| 1,418,838 A | 6/1922 | Setz | |
| 1,511,338 A | 10/1924 | Cyril | |
| 1,527,166 A | 2/1925 | Maurice | |
| 1,639,308 A | 8/1927 | Orr | |
| 1,869,178 A | 7/1932 | Thuras | |
| 1,967,682 A | 7/1934 | Ochtman, Jr. | |
| 1,969,704 A | 8/1934 | D'Alton | |
| 2,025,297 A | 12/1935 | Meyers | |
| 2,224,475 A | 12/1940 | Evans | |
| 2,252,914 A | 8/1941 | Balton | |
| 2,283,567 A | 5/1942 | Barton | |
| 2,442,917 A | 6/1948 | Butterfield | |
| 2,451,271 A | 10/1948 | Balster | |
| 2,468,976 A | 5/1949 | Herreshoff | |
| 2,471,509 A | 5/1949 | Anderson | |
| 2,878,990 A | 3/1950 | Zurcher | |
| 2,595,761 A * | 5/1952 | Butterfield | F16C 3/12 74/597 |
| 2,644,433 A | 7/1953 | Anderson | |
| 2,761,516 A | 9/1956 | Vassilkovsky | |
| 2,766,839 A | 10/1956 | Baruch | |
| 2,898,894 A | 8/1959 | Holt | |
| 2,915,050 A | 12/1959 | Allred | |
| 2,956,738 A | 10/1960 | Rosenschold | |
| 2,977,943 A | 4/1961 | Lieberherr | |
| 2,979,046 A | 4/1961 | Hermann | |
| 3,033,184 A | 5/1962 | Jackson | |
| 3,035,879 A | 5/1962 | Jost | |
| 3,113,561 A | 12/1963 | Heintz | |
| 3,143,282 A | 8/1964 | McCrory | |
| 3,154,059 A | 10/1964 | Witzky | |
| 3,171,425 A | 3/1965 | Berlyn | |
| 3,275,057 A | 9/1966 | Trevor | |
| 3,399,008 A | 8/1968 | Farrell | |
| 3,409,410 A | 11/1968 | Spence | |
| 3,491,654 A | 1/1970 | Zurcher | |
| 3,534,771 A | 10/1970 | Everdam | |
| 3,621,821 A | 11/1971 | Jarnuszkiewicz | |
| 3,749,318 A | 7/1973 | Cottell | |
| 3,881,459 A | 5/1975 | Gaetcke | |
| 3,892,070 A | 7/1975 | Bose | |
| 3,911,753 A | 10/1975 | Daub | |
| 3,973,532 A | 8/1976 | Litz | |
| 4,043,224 A | 8/1977 | Quick | |
| 4,046,028 A | 9/1977 | Vachris | |
| 4,077,429 A | 3/1978 | Kimball | |
| 4,127,332 A | 11/1978 | Thiruvengadam | |
| 4,128,388 A | 12/1978 | Freze | |
| 4,164,988 A | 8/1979 | Virva | |
| 4,182,282 A | 1/1980 | Pollet | |
| 4,185,597 A | 1/1980 | Cinquegrani | |
| 4,271,803 A | 6/1981 | Nakanishi | |
| 4,300,499 A | 11/1981 | Nakanishi | |
| 4,312,305 A | 1/1982 | Noguchi | |
| 4,324,214 A | 4/1982 | Garcea | |
| 4,331,118 A | 5/1982 | Cullinan | |
| 4,332,229 A | 6/1982 | Schuit | |
| 4,343,605 A | 8/1982 | Browning | |
| 4,357,916 A | 11/1982 | Noguchi | |
| 4,383,508 A | 5/1983 | Irimajiri | |
| 4,467,752 A | 8/1984 | Yunick | |
| 4,480,597 A | 11/1984 | Noguchi | |
| 4,488,866 A | 12/1984 | Schirmer | |
| 4,541,377 A | 9/1985 | Amos | |
| 4,554,893 A | 11/1985 | Vecellio | |
| 4,570,589 A | 2/1986 | Fletcher | |
| 4,576,126 A | 3/1986 | Ancheta | |
| 4,592,318 A | 6/1986 | Pouring | |
| 4,597,342 A | 7/1986 | Green | |
| 4,598,687 A | 7/1986 | Hayashi | |
| 4,669,431 A | 6/1987 | Simay | |
| 4,715,791 A | 12/1987 | Berlin | |
| 4,724,800 A | 2/1988 | Wood | |
| 4,756,674 A | 7/1988 | Miller | |
| 4,788,942 A | 12/1988 | Pouring | |
| 4,809,652 A * | 3/1989 | Essig | F02F 3/022 123/193.6 |
| 4,815,422 A * | 3/1989 | Schaich | F01L 1/285 123/279 |
| 4,836,154 A | 6/1989 | Bergeron | |
| 4,874,310 A | 10/1989 | Seemann | |
| 4,879,974 A | 11/1989 | Alvers | |
| 4,919,611 A | 4/1990 | Flament | |
| 4,920,937 A | 5/1990 | Sasaki | |
| 4,936,269 A | 6/1990 | Beaty | |
| 4,969,425 A | 11/1990 | Slee | |
| 4,990,074 A | 2/1991 | Nakagawa | |
| 4,995,349 A | 2/1991 | Tuckey | |
| 5,004,066 A | 4/1991 | Furukawa | |
| 5,007,392 A | 4/1991 | Niizato | |
| 5,020,504 A | 6/1991 | Morikawa | |
| 5,083,539 A | 1/1992 | Cornelio | |
| 5,154,141 A | 10/1992 | McWhorter | |
| 5,168,843 A | 12/1992 | Franks | |

(56) References Cited

U.S. PATENT DOCUMENTS

| | | | |
|---|---|---|---|
| 5,213,074 A | 5/1993 | Imagawa | |
| 5,222,879 A | 6/1993 | Kapadia | |
| 5,251,817 A | 10/1993 | Ursic | |
| 5,343,618 A | 9/1994 | Arnold | |
| 5,357,919 A | 10/1994 | Ma | |
| 5,390,634 A | 2/1995 | Walters | |
| 5,397,180 A | 3/1995 | Miller | |
| 5,398,645 A | 3/1995 | Haman | |
| 5,454,712 A | 10/1995 | Yap | |
| 5,464,331 A * | 11/1995 | Sawyer | F02B 63/06 417/364 |
| 5,479,894 A | 1/1996 | Noltemeyer | |
| 5,694,891 A | 12/1997 | Liebich | |
| 5,714,721 A | 2/1998 | Gawronski | |
| 5,779,461 A | 7/1998 | Iizuka | |
| 5,791,303 A | 8/1998 | Skripov | |
| 5,872,339 A | 2/1999 | Hanson | |
| 5,937,821 A | 8/1999 | Oda | |
| 5,957,096 A | 9/1999 | Clarke | |
| 6,003,488 A | 12/1999 | Roth | |
| 6,019,188 A | 2/2000 | Nevill | |
| 6,119,648 A | 9/2000 | Araki | |
| 6,138,616 A | 10/2000 | Svensson | |
| 6,138,639 A | 10/2000 | Hiraya | |
| 6,199,369 B1 | 3/2001 | Meyer | |
| 6,205,962 B1 | 3/2001 | Berry, Jr. | |
| 6,237,164 B1 | 5/2001 | LaFontaine | |
| 6,257,180 B1 | 7/2001 | Klein | |
| 6,363,903 B1 | 4/2002 | Hayashi | |
| 6,382,145 B2 | 5/2002 | Matsuda | |
| 6,401,702 B1 * | 6/2002 | Konig | F02B 23/00 123/193.6 |
| 6,418,905 B1 | 7/2002 | Baudlot | |
| 6,446,592 B1 | 9/2002 | Wilksch | |
| 6,474,288 B1 | 11/2002 | Blom | |
| 6,494,178 B1 | 12/2002 | Cleary | |
| 6,508,210 B2 | 1/2003 | Knowlton | |
| 6,508,226 B2 | 1/2003 | Tanaka | |
| 6,536,420 B1 | 3/2003 | Cheng | |
| 6,546,902 B1 * | 4/2003 | Davis | F01L 1/285 123/790 |
| 6,639,134 B2 | 10/2003 | Schmidt | |
| 6,668,703 B2 | 12/2003 | Gamble | |
| 6,682,313 B1 | 1/2004 | Sulmone | |
| 6,691,932 B1 | 2/2004 | Schultz | |
| 6,699,031 B2 | 3/2004 | Kobayashi | |
| 6,705,281 B2 | 3/2004 | Okamura | |
| 6,718,938 B2 | 4/2004 | Szorenyi | |
| 6,758,170 B1 | 7/2004 | Walden | |
| 6,769,390 B2 | 8/2004 | Hattori | |
| 6,814,046 B1 | 11/2004 | Hiraya | |
| 6,832,589 B2 | 12/2004 | Kremer | |
| 6,834,626 B1 | 12/2004 | Holmes | |
| 6,971,379 B2 | 12/2005 | Sakai | |
| 6,973,908 B2 | 12/2005 | Paro | |
| 7,074,992 B2 | 7/2006 | Schmidt | |
| 7,150,609 B2 | 12/2006 | Kiem | |
| 7,261,079 B2 | 8/2007 | Gunji | |
| 7,296,545 B2 | 11/2007 | Ellingsen, Jr. | |
| 7,341,040 B1 | 3/2008 | Wiesen | |
| 7,360,531 B2 | 4/2008 | Yohso | |
| 7,452,191 B2 | 11/2008 | Tell | |
| 7,559,298 B2 | 7/2009 | Cleeves | |
| 7,576,353 B2 | 8/2009 | Diduck | |
| 7,584,820 B2 | 9/2009 | Parker | |
| 7,628,606 B1 | 12/2009 | Browning | |
| 7,634,980 B2 | 12/2009 | Jarnland | |
| 7,717,701 B2 | 5/2010 | D'Agostini | |
| 7,810,479 B2 | 10/2010 | Naquin | |
| 7,900,454 B2 | 3/2011 | Schoell | |
| 7,984,684 B2 | 7/2011 | Hinderks | |
| 8,037,862 B1 | 10/2011 | Jacobs | |
| 8,215,292 B2 | 7/2012 | Bryant | |
| 8,251,040 B2 | 8/2012 | Jang | |
| 8,284,977 B2 | 10/2012 | Ong | |
| 8,347,843 B1 | 1/2013 | Batiz-Vergara | |
| 8,385,568 B2 | 2/2013 | Goel | |
| 8,479,871 B2 | 7/2013 | Stewart | |
| 8,640,669 B2 | 2/2014 | Nakazawa | |
| 8,656,870 B2 | 2/2014 | Sumilla | |
| 8,714,135 B2 | 5/2014 | Anderson | |
| 8,776,759 B2 | 7/2014 | Cruz | |
| 8,800,527 B2 | 8/2014 | McAlister | |
| 8,827,176 B2 | 9/2014 | Browning | |
| 8,857,405 B2 | 10/2014 | Attard | |
| 8,863,724 B2 | 10/2014 | Shkolnik | |
| 8,919,321 B2 | 12/2014 | Burgess | |
| 9,175,736 B2 | 11/2015 | Greuel | |
| 9,289,874 B1 | 3/2016 | Sabo | |
| 9,309,807 B2 | 4/2016 | Burton | |
| 9,441,573 B1 | 9/2016 | Sergin | |
| 9,512,779 B2 | 12/2016 | Redon | |
| 9,736,585 B2 | 8/2017 | Pattok | |
| 9,739,382 B2 | 8/2017 | Laird | |
| 9,822,968 B2 | 11/2017 | Tamura | |
| 9,854,353 B2 | 12/2017 | Wang | |
| 9,938,927 B2 | 4/2018 | Ando | |
| 2002/0114484 A1 | 8/2002 | Crisco | |
| 2002/0140101 A1 | 10/2002 | Yang | |
| 2003/0111122 A1 | 6/2003 | Horton | |
| 2005/0036896 A1 | 2/2005 | Navarro | |
| 2005/0087166 A1 | 4/2005 | Rein | |
| 2005/0155645 A1 | 7/2005 | Freudendahl | |
| 2005/0257837 A1 | 11/2005 | Bailey | |
| 2006/0230764 A1 | 10/2006 | Schmotolocha | |
| 2007/0039584 A1 | 2/2007 | Ellingsen, Jr. | |
| 2007/0101967 A1 | 5/2007 | Pegg | |
| 2008/0169150 A1 | 7/2008 | Kuo | |
| 2008/0184878 A1 | 8/2008 | Chen | |
| 2008/0185062 A1 | 8/2008 | Johannes Nijland | |
| 2010/0071640 A1 | 3/2010 | Mustafa | |
| 2011/0030646 A1 | 2/2011 | Barry | |
| 2011/0132309 A1 | 6/2011 | Turner | |
| 2011/0139114 A1 | 6/2011 | Nakazawa | |
| 2011/0235845 A1 | 9/2011 | Wang | |
| 2012/0103302 A1 | 5/2012 | Attard | |
| 2012/0114148 A1 | 5/2012 | Goh Kong San | |
| 2012/0186561 A1 | 7/2012 | Bethel | |
| 2013/0036999 A1 | 2/2013 | Levy | |
| 2013/0327039 A1 | 12/2013 | Schenker et al. | |
| 2014/0056747 A1 | 2/2014 | Kim | |
| 2014/0109864 A1 | 4/2014 | Drachko | |
| 2014/0199837 A1 | 7/2014 | Hung | |
| 2014/0361375 A1 | 12/2014 | Deniz | |
| 2015/0059718 A1 | 3/2015 | Claywell | |
| 2015/0153040 A1 | 6/2015 | Rivera Garza | |
| 2015/0167536 A1 | 6/2015 | Toda et al. | |
| 2015/0184612 A1 | 7/2015 | Takada et al. | |
| 2015/0300402 A1 * | 10/2015 | Wilhelm | F16C 3/12 74/598 |
| 2015/0337878 A1 | 11/2015 | Schlosser | |
| 2015/0354570 A1 | 12/2015 | Karoliussen | |
| 2016/0017839 A1 * | 1/2016 | Johnson | F02F 1/183 123/657 |
| 2016/0064518 A1 | 3/2016 | Liu | |
| 2016/0258347 A1 | 9/2016 | Riley | |
| 2016/0265416 A1 | 9/2016 | Ge | |
| 2016/0348611 A1 | 12/2016 | Suda et al. | |
| 2016/0348659 A1 | 12/2016 | Pinkerton | |
| 2016/0356216 A1 | 12/2016 | Klyza | |
| 2017/0248099 A1 | 8/2017 | Wagner | |
| 2017/0260725 A1 | 9/2017 | McAlpine | |
| 2018/0096934 A1 | 4/2018 | Siew | |
| 2018/0130704 A1 | 5/2018 | Li | |

FOREIGN PATENT DOCUMENTS

| | | |
|---|---|---|
| CN | 206131961 | 4/2017 |
| DE | 19724225 | 12/1998 |
| EP | 0025831 | 4/1981 |
| EP | 2574796 | 4/2013 |
| FR | 1408306 | 8/1965 |
| FR | 2714473 | 6/1995 |
| GB | 104331 | 1/1918 |

(56) References Cited

FOREIGN PATENT DOCUMENTS

| | | |
|---|---|---|
| GB | 139271 | 3/1920 |
| GB | 475179 | 11/1937 |
| GB | 854135 | 11/1960 |
| GB | 1437340 | 5/1976 |
| GB | 1504279 | 3/1978 |
| GB | 1511538 | 5/1978 |
| GB | 2140870 | 12/1984 |
| JP | S5377346 | 7/1978 |
| JP | S5833393 | 2/1983 |
| JP | 58170840 | 10/1983 |
| JP | S5973618 | 4/1984 |
| JP | H02211357 | 8/1990 |
| JP | H0638288 | 5/1994 |
| JP | 2000064905 | 3/2000 |
| JP | 2003065013 | 3/2003 |
| JP | 5535695 | 7/2014 |
| TW | 201221753 | 6/2012 |
| WO | 1983001485 | 4/1983 |
| WO | 2006046027 | 5/2006 |
| WO | 2007065976 | 6/2007 |
| WO | 2010118518 | 10/2010 |
| WO | 2016145247 | 9/2016 |

OTHER PUBLICATIONS

International Searching Authority Search Report and Written Opinion for application PCT/US2018/024102, dated Jun. 25, 2018, 10 pages.
International Searching Authority Search Report and Written Opinion for application PCT/US2018/024477, dated Jul. 20, 2018, 14 pages.
International Searching Authority Search Report and Written Opinion for application PCT/US2018/024485, dated Jun. 25, 2018, 16 pages.
International Searching Authority Search Report and Written Opinion for application PCT/US2018/024844, dated Jun. 8, 2018, 9 pages.
International Searching Authority Search Report and Written Opinion for application PCT/US2018/024852, dated Jun. 21, 2018, 9 pages.
International Searching Authority Search Report and Written Opinion for application PCT/US2018/025133, dated Jun. 28, 2018, 9 pages.
International Searching Authority Search Report and Written Opinion for application PCT/US2018/025151, dated Jun. 25, 2018, 14 pages.
International Searching Authority Search Report and Written Opinion for application PCT/US2018/025471, dated Jun. 21, 2018, 10 pages.
International Searching Authority Search Report and Written Opinion for application PCT/US2018/029947, dated Jul. 26, 2018, 12 pages.
International Searching Authority Search Report and Written Opinion for application PCT/US2018/030937, dated Jul. 9, 2018, 7 pages.
International Searching Authority Search Report and Written Opinion for application PCT/US2018/053264, dated Dec. 3, 2018, 10 pages.
International Searching Authority Search Report and Written Opinion for application PCT/US2018/053350, dated Dec. 4, 2018, 7 pages.
International Searching Authority Search Report and Written Opinion for application PCT/US2019/014936, dated Apr. 18, 2019, 9 pages.
International Searching Authority Search Report and Written Opinion for application PCT/US2019/015189, dated Mar. 25, 2019, 10 pages.
Keller, L E., "Application of Trunk Piston Labyrinth Compressors in Refrigeration and Heat Pump Cycles" (1992). International Compressor Engineering Conference. Paper 859. http://docs.lib.purdue.edu/icec/859.
Quasiturbine Agence, "Theory—Quasiturbine Concept" [online], Mar. 5, 2005 (Mar. 5, 2005), retrieved from the internet on Jun. 29, 2018) URL:http://quasiturbine.promci.qc.ca/ETheoryQTConcept.htm; entire document.
Vetter, H., "The Sulzer Oil-Free Labyrinth Piston Compressor" (1972). International Compressor Engineering Conference. Paper 33. http://docs.lib.purdue.edu/icec/33.

\* cited by examiner

INTERNAL COMBUSTION ENGINE

CROSS REFERENCE TO RELATED APPLICATIONS

This application relates to and claims the priority of U.S. provisional patent application Ser. No. 62/501,295, which was filed May 4, 2017; and U.S. provisional patent application Ser. No. 62/479,013, which was filed Mar. 30, 2017; and U.S. provisional patent application Ser. No. 62/491,629, which was filed Apr. 28, 2017; and U.S. patent application Ser. No. 15/903,636, which was filed Feb. 23, 2018.

FIELD OF THE INVENTION

The present invention relates generally to internal combustion engines and methods of engine operation.

BACKGROUND OF THE INVENTION

Many internal combustion engines utilize cooperative engine cylinder and piston arrangements to generate power using a pumping motion. Engine cylinder and piston arrangements may be used to intake or scavenge an air-fuel mixture or strictly air charge (in fuel injected engines) for combustion and expel spent exhaust gases in multicycle operations, such as, for example, in 2-cycle and 4-cycle operations. While embodiments of the present invention have primary use for 4-cycle engine operation, the claims defining the invention are not limited to 4-cycle engines unless such limitation is expressly set forth in the claims.

Further, it is to be appreciated that the reference herein to an engine "cylinder" is not limited to a combustion chamber having a cylindrical shape or circular cross-section. Instead, the term cylinder refers to any combustion chamber or cavity of any shape that receives a piston having an outer shape adapted to effectively seal (i.e., to permit an acceptable level of leakage) with the sidewall of the cylinder. The seal should be in effect as the piston slides back and forth reciprocally within the engine cylinder in a pumping motion.

Engine cylinders may include one or more intake ports and one or more exhaust ports that, collectively, permit gases to flow into, and out of, the engine cylinder, respectively. Engine valves, such as poppet valves, may be used to selectively open and close the intake and exhaust ports. The selectively timed opening and closing of the intake and exhaust valves, in conjunction with the pumping motion of the engine pistons and the introduction of fuel, may provide an air/fuel charge to the engine cylinder for combustion and removal of the spent charge exhaust gases from the cylinder after combustion.

Existing internal combustion engine pistons used for Otto cycle or Diesel cycle operation, for example, typically have a generally cylindrical shape. More specifically, the typical Otto or Diesel cycle engine piston may have a generally smooth cylindrically shaped skirt with a circular cross-section that includes circumferential recesses to receive one or more sealing piston rings. The piston and piston ring assembly may slide reciprocally within a cylinder between top dead center and bottom dead center positions. The interface of the piston rings with the cylinder wall may be lubricated with engine oil, for example.

The efficiency of a particular engine design may be a function of many factors. Among others, these factors include engine weight to power ratio, as well as the overhead space available for the placement of intake valves, exhaust valves, auxiliary valves, spark plugs, glow plugs, fuel injectors and water injectors. Engine power is often a function, at least in part, of cylinder displacement. Engine weight is a function, at least in part, of the space required to house the engine pistons, which is a function of the engine cylinder and piston shape. Cylindrically shaped engine pistons require a certain amount of space per unit volume of displacement, and the required space is a function of the diameter of the piston skirt. The overhead space available for the placement of intake valves, exhaust valves, auxiliary valves, spark plugs, glow plugs, fuel injectors and water injectors in cylindrically shaped engine pistons is also limited by (i.e., a function of) the diameter of the piston skirt. Accordingly, circular cross-section engine cylinders and pistons may be less desirable in terms of engine space, weight and overhead space, than non-circular cross-section pistons and cylinders, for a given engine displacement and power rating.

Honda developed one known example of a non-circular cross-section engine piston for a motorcycle engine. Honda's oval piston internal combustion engine is described in U.S. Pat. No. 4,383,508 to Irimajiri et al. Honda employed oval pistons to obtain increased cylinder displacement and increased overhead area available for valves, spark plugs, and injectors. However, Honda's oval shaped piston engine was not optimal, and required the use of two connecting rods between each piston and the crankshaft, thereby increasing the weight and size of the overall engine. The Honda oval pistons also required the use of special technology to keep the pistons moving parallel to the cylinder block walls, thereby increasing weight and complexity of the engine. Accordingly, there is a need for engines with non-circular cross-section cylinders and pistons that improve upon the Honda implementation in terms of weight, space required, and the placement of intake valves, exhaust valves, auxiliary valves, spark plugs, glow plugs, fuel injectors and water injectors.

Two additional factors which impact engine efficiency are flame front propagation during combustion of fuel, and effective force transfer from the expansion of combustion gases to the piston used to generate power. Pistons having an upper end or head with a hemispherical or domed shape are known for their efficient flame front propagation properties and effective force transfer of combustion gases to piston. However, hemispherical pistons were not utilized in engines with non-circular cross-section cylinders and pistons. Accordingly, there is a need for pistons with hemispherical or domed heads to be used in engines with non-circular cross-section cylinders and pistons.

Engine space and weight is also a function of crankshaft and connector rod design. As already noted, the Honda engine employing particular oval cross-section pistons required two connector rods per piston, thereby increasing engine weight and complexity. Accordingly, there is a need for compact crankshaft and connector rod assemblies for use with non-circular cross-section pistons in particular, and for all engines generally, that is optimal in terms of weight, required space, cost, and/or reliability.

The manufacturing cost and the repair cost are also factors that require consideration for commercialization of the engines. Crankshaft assemblies typically require the use of splined elements to join the constituent elements, such as shafts, and cranks, together. Splined elements may require relatively expensive manufacturing processes to produce, and are relatively difficult and expensive to repair. Moreover, it is desirable for some engines to permit the center shaft of a crankshaft assembly to break away cleanly from the other elements to which it is connected during an engine failure condition. Crankshaft elements joined using splines are not well suited to break away from each other during an engine failure, and if they were designed to do so, repair would likely be difficult and expensive. Accordingly, there is a need for crankshaft assemblies that do not require splined elements to join the constituent parts of the assemblies together.

Internal combustion engines almost universally require liquid lubricant, such as engine oil, to lubricate the interface between the piston and the cylinder within which it moves back and forth in a reciprocal motion. Lubrication systems are usually mission critical and the failure of a lubrication system can be catastrophic. The need for a piston lubricant brings with it many disadvantages. The lubricant wears out and becomes contaminated over time, and thus requires replacement, adding expense and inconvenience to engine operation. Many lubricants require pumps and passages to reapply the lubricant to moving parts, such as the engine pistons. Pumps and passages, and other elements of an active lubrication system need to operate correctly and require seals between interconnected elements. Lubrication system leaks naturally occur as seals deteriorate over time, and pumps leak and wear out, adding still further maintenance expense and inconvenience to engine operation. Leaks can also permit lubricant to enter the combustion chamber, interfering with combustion, and fouling injectors and spark or glow plugs. Lubricant in the combustion chamber can also result in unwanted exhaust emissions. Leaks can also result in the contamination of the lubricant with combustion by-products. All of the foregoing issues are attendant to the use of lubricated pistons, and all add failure modes and maintenance costs. Accordingly, there is a need for internal combustion engines that depend less, or not at all, on piston lubrication.

Engine efficiency and power may also be a function of the mass of air in the combustion chamber. The air mass that can be loaded into the combustion chamber is a function of the pressure differential between the combustion chamber and the intake air source (e.g., manifold) during the intake cycle, as well as the effective size and flow characteristics of the intake port, and the duration of the intake cycle event. Increasing any one or more of the intake air pressure, the effective size and/or flow profile of the intake port, and/or the effective intake cycle duration, will tend to increase air mass in the combustion chamber, and thus improve efficiency and power. Accordingly, there is a need for engines and methods of engine operation that increase and/or improve intake air pressure, intake port size and flow, and/or intake event duration.

In addition to improving air mass transfer to the engine cylinder for combustion, improved engine efficiency and power may also result from optimal swirl and turbulence of the intake air or air/fuel mixtures in cylinder squish areas. The swirl and turbulence produced in squish areas is a function of numerous factors, including the shape of the upper end of the piston and cylinder head defining the combustion chamber. Accordingly, there is a need for engine pistons and cylinders shaped to promote optimal swirl and turbulence in the combustion chamber squish areas.

Engine efficiency and power, resulting from air mass transfer to the engine cylinder for combustion for example, may also be a function of the timing of the opening and closing of engine intake valves. The timing for opening and closing exhaust and auxiliary valves can also affect efficiency and power. Conventional fixed time valve actuation may be set to be optimal for one set of engine operation parameters (e.g., ambient temperature, pressure, fuel type and richness of mixture, engine speed and load, etc.). Fixed time valve actuation may be sub-optimal for all other combinations of engine operation conditions. In order to provide improved efficiency and power, engines have been provided with variable valve actuators (VVA), however the control of existing VVA systems may be complicated and expensive. Accordingly, there is a need for intake, exhaust, and auxiliary variable valve actuation systems that provide variable valve timing without the need for overly complicated or expensive componentry.

Some vehicles and other engine powered machines may benefit from engines having a low center of mass relative to the vehicle or machine structure. A low center of mass may improve handling characteristics, for example. Known internal combustion engines have centers of mass dictated, at least in part, by the need to place heavy cylinder heads and associated components at the top of the engines. The location of the cylinder heads at the top of the engines results from the need to lubricate the pistons in a manner that restricts the amount of lubricating oil that enters the combustion chambers. Accordingly, there is a need for engines with innovative piston lubrication solutions. New lubrication systems, methods and/or substitutes may eliminate the need to place heavy cylinder heads and associated components at the top of the engine thereby permitting the design of engines with a lower center of mass compared to other engines of comparable weight, power and cost.

OBJECTS OF THE INVENTION

Accordingly, it is an object of some, but not necessarily all embodiments of the present invention to provide engines and methods of engine operation that decrease the amount of space required for an engine of a given displacement and/or power rating by using engine pistons with a non-circular cross-section. It is also an object of some, but not necessarily all embodiments of the present invention to provide engines and methods of engine operation that decrease the weight of an engine of a given displacement and/or power rating by using engine pistons with a non-circular cross-section. Engines with non-circular cross-section cylinders and pistons may produce the same power as a circular cross-section cylinder engine with less wasted space because the pistons are located closer to one another, thereby decreasing the engine weight and effectively increasing the power to weight ratio of the engine. In particular, engines with rounded corner rectangular or stretched oval cross-sectional shapes may provide improved weight to power ratio.

It is also an object of some, but not necessarily all embodiments of the present invention to provide engines with increased overhead space for the placement of intake valves, exhaust valves, auxiliary valves, spark plugs, glow plugs, fuel injectors and water injectors. Non-circular cross-section cylinders may provide more head surface area than circular cross-section cylinders in engines of comparable weight.

It is also an object of some, but not necessarily all, embodiments of the present invention to provide engines and methods of engine operation that permit a spark plug, glow plug, water injector, and/or fuel injector to be centrally located over the piston in an area of squish and/or turbulence. By locating the injector near the center of the piston near the spark or glow plug, and in the more turbulent area of squish and swirl, fuel may be injected during the appropriate times around top dead center with appropriate mixing into the compressed gasses thereby allowing an improved ratio mix or a localized lean mix of the compressed charge.

This may allow more radical valve timing to achieve chamber blow-down without unspent fuel loss through the exhaust port and permit a shallower compression stroke by allowing some of the intake air to be returned to the intake before closing the intake valve, thereby generating a comparably longer expansion stroke.

It is also an object of some, but not necessarily all embodiments of the present invention to provide engines, and methods of engine operation that utilize cooperative engine piston head and cylinder shapes that include an upper surface that is non-flat, preferably curved or domed, more preferably semi-hemispherical, and even more preferably includes one or more depressions. In this regard, it is also an object of some, but not necessarily all embodiments of the present invention to provide engine piston head and cylinder shapes that promote swirl and turbulence in the engine cylinder.

It is also an object of some, but not necessarily all, embodiments of the present invention to provide engines, methods of engine manufacturing, and methods of engine operation that promote an optimal and/or shortened flame front propagation during combustion.

It is also an object of some, but not necessarily all embodiments of the present invention to provide engines and methods of engine operation that eliminate the need to lubricate the piston-cylinder interface, thereby reducing engine complexity, cost, and maintenance requirements. In this regard, some embodiments of the present invention may employ cooperatively shaped pistons and cylinder walls that have surface features that form an effective seal equivalent between them without the need for piston rings or lubrication.

It is also an object of some, but not necessarily all embodiments of the present invention to provide engines and methods of engine operation that decrease the weight of an engine of a given displacement and/or power rating by using the engine pistons to boost the pressure of intake air provided to the engine cylinders for combustion. In this regard, the sealed cavity under the piston may be used in a two-stroke process to act as a compressor and boost intake pressure like a supercharger. This permits previously underutilized space to be more efficiently employed to benefit engine power. Locating the "supercharger" directly within the engine may reduce associated power losses due to pumping and power transfer when compared with an externally located superchargers driven by pulleys, belts, or gears from a crankshaft output.

It is also an object of some, but not necessarily all embodiments of the present invention to provide engines and methods of engine operation in which the combustion and supercharger chambers are sealed using lubricant (e.g., oil) transported through the piston to directly prime, pressurize, and lubricate these seals.

It is also an object of some, but not necessarily all embodiments of the present invention to provide engines and methods of engine operation in which excess leakage between the combustion chamber and the supercharging chamber are recirculated to the combustion chamber by the supercharger process as charge recapture and/or exhaust gas recirculation to reduce emissions. It is also an object of some, but not necessarily all embodiments of the present invention to reduce leakage from the combustion chamber into the crankcase as the supercharger chamber may act as a diluting buffer between the combustion chamber and the crankcase.

It is also an object of some, but not necessarily all embodiments of the present invention to provide engines and methods of engine operation that limit or prevent the infiltration of oil into the combustion and supercharging chambers, thereby reducing objectionable emissions. By removing oil from the system, where practical, the oil aerosols are eliminated from the exhaust gasses, thereby preventing oil and oil by-product accumulation on the valves, injectors, spark plugs, turbochargers, catalytic converters, and other engine system components.

It is also an object of some, but not necessarily all embodiments of the present invention to provide engines and methods of engine operation that limit or prevent the infiltration of combustion by products and by-products into the oil, which can introduce carbon particles, unspent hydrocarbons, and other particulates which can contaminate and modify the pH of the oil. Reducing or eliminating these oil contamination sources may prevent oil system corrosion and prolong the oil service life thereby decreasing required maintenance costs and decreasing ancillary oil handling, stocking, and recycling costs.

It is also an object of some, but not necessarily all embodiments of the present invention to provide engines and methods of engine operation with more compact and lighter crankshaft, connecting rod, and cross-head assemblies. It is also an object of some, but not necessarily all embodiments of the present invention to provide engines and methods of engine operation with crankshaft, connecting rod, and cross-head assemblies configured for use with engine cylinders and pistons with non-circular cross-sections.

It is also an object of some, but not necessarily all embodiments of the present invention to provide engines and methods of engine operation with break-away engine components, such as cranks on the crankshaft. To this end, some engine components, such as shafts and cranks may be joined using multiple commercially mass produced pins or keys without the use of splined elements, which tend to require expensive manufacturing processes. The multiple pins or keys may create a replaceable spline-like structure to transmit torque and rotational energy that will shear during abnormal operating conditions to preserve the engine while allowing only minimal damage to the two joined elements. After a failure, the shorn pins or keys can be replaced quickly to decrease down-time.

It is also an object of some, but not necessarily all embodiments of the present invention to provide engines and methods of engine operation with a multi-stage telescoping poppet valve. Using a multi-stage poppet valve, a set volume of air can be loaded into the engine cylinder faster and with less restriction, which may reduce pumping losses and improve operation at high RPM ranges. The multi-stage poppet valve design may allow a portion of the inner valve surface area to be opened for air flow. In a fixed embodiment, this design may allow some poppet valve moving mass to be removed from the valve train, allowing the valve to open slightly faster and to maintain control without floating at slightly higher RPMs. This valve design may be used with an additional valve train (e.g., independent cam, rocker or VVA) allowing the individual inner and outer valves to actuate independently. This may create a multistage variable aperture valve with both inner and outer sections able to be controlled with variable valve timing dependent upon engine conditions. A control strategy may also allow this valve design to replace a separate throttle plate, as the valve itself can act as a computer controllable variable restriction in the engine's intake path.

It is also an object of some, but not necessarily all embodiments of the present invention to provide engines and methods of engine operation in which the engine normally operates in an inverted or piston head down orientation. Engines in which the pistons and cylinder heads are below the crankshaft (i.e., closer to the center of the local gravitationally dominant terrestrial body) may have a comparably lower center of mass than conventionally oriented engines. This lower center of mass may provide advantages to engine operation, and when the engine is mounted in a vehicle, advantages to vehicle operation.

These and other advantages of some, but not necessarily all, embodiments of the present invention will be apparent to those of ordinary skill in the art.

SUMMARY OF THE INVENTION

Responsive to the foregoing challenges, Applicant has developed an innovative internal combustion engine comprising: an internal combustion engine comprising: an engine cylinder having a cylinder wall; a piston disposed in the engine cylinder, said piston having a skirt and a head; a combustion chamber adjacent to the piston head defined by the cylinder wall; a first cross-head guide disposed proximal to the piston; a second cross-head guide disposed distal from the piston; a cross-head connected to the piston, said cross-head extending between and slidably received by the first cross-head guide and the second cross-head guide; two connecting rods each having a first end pivotally connected to the cross-head, and a second end distal from the first end, wherein the two connecting rods are disposed on opposites sides of the cross-head and rigidly connected to each other; a first crank disposed in a crankcase and pivotally connected to the second end of a first of the two connecting rods; a second crank disposed in the crankcase and pivotally connected to the second end of a second of the two connecting rods; a first split crankshaft section connected to the first crank; and a second split crankshaft section connected to the second crank.

Applicant has further developed an innovative internal combustion engine comprising: an engine cylinder having a cylinder wall; a piston disposed in the engine cylinder, said piston having a skirt and a head; a combustion chamber adjacent to the piston head defined by the cylinder wall; a first cross-head guide disposed proximal to the piston; a second cross-head guide disposed distal from the piston; a crankcase disposed between the first cross-head guide and the second cross-head guide; a cross-head connected to the piston, said cross-head extending between and slidably received by the first cross-head guide and the second cross-head guide, said cross-head having a lower extension; and an oil reservoir connected to the crankcase by one or more drain passages, wherein the cross-head lower extension is configured to agitate oil in the oil reservoir as a result of engine operation.

Applicant has still further developed an innovative internal combustion engine comprising: an engine cylinder having a cylinder wall; a piston disposed in the engine cylinder, said piston having a skirt and a head; a combustion chamber adjacent to the piston head defined by the cylinder wall; a crank connected through one or more members to the piston, said crank having a plurality of crank keyholes formed in the crank; a crankshaft member, said crankshaft member having a plurality of crankshaft keyholes formed in the crankshaft section; and a plurality of pins/keys disposed in and extending between the plurality of crank keyholes and the plurality of crankshaft keyholes.

Applicant has still further developed an innovative method of lubricating a crankshaft assembly in an internal combustion engine, comprising the steps of: providing lubricant in an engine reservoir; providing a crankcase in which the crankshaft assembly including a cross-head operate, said cross-head having a lower extension that contacts the lubricant in the engine reservoir; and agitating the lubricant in the engine reservoir using motion of the lower extension of the cross-head.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Figure 1:
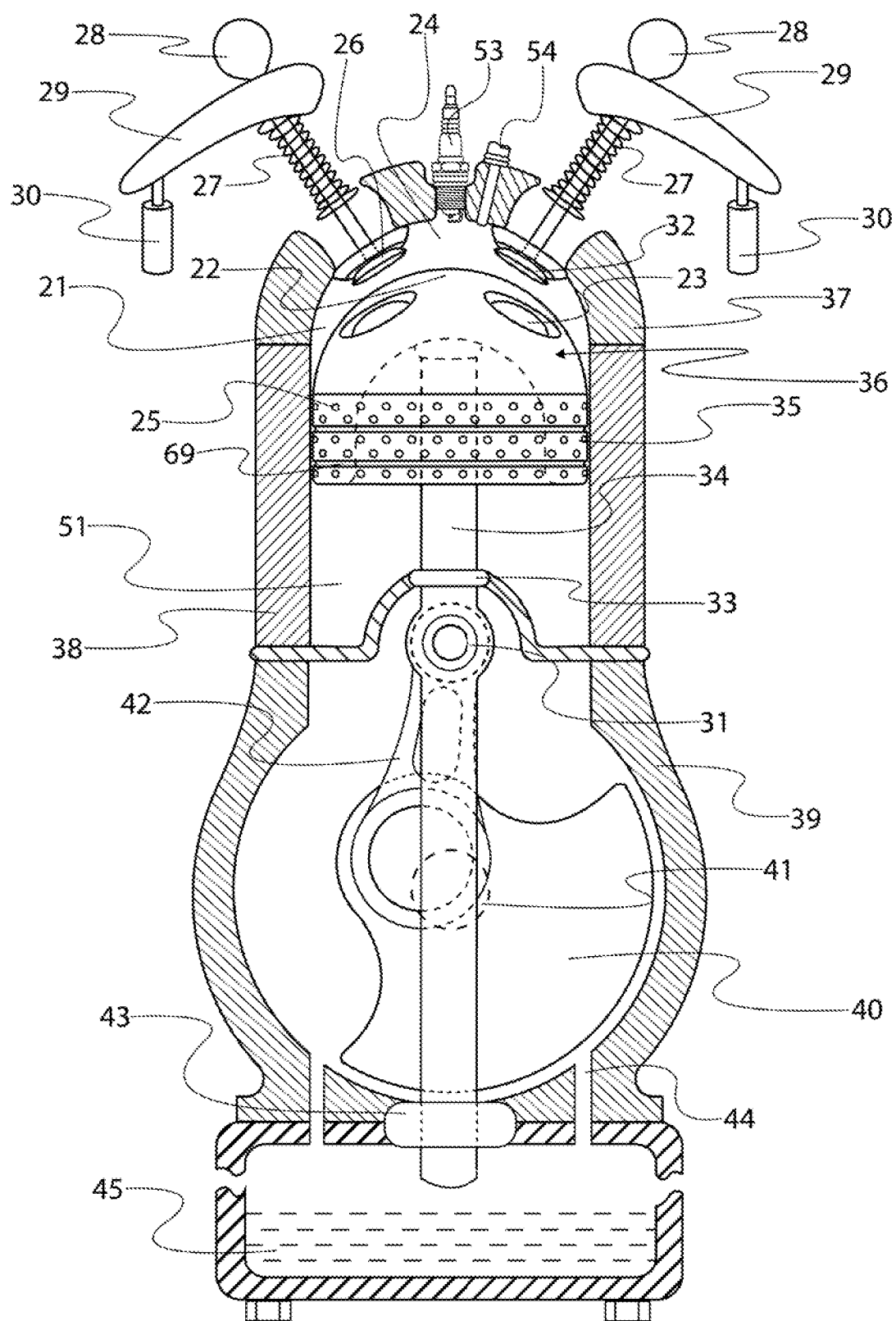
FIG. 1 is a partial cross-sectional end view of an internal combustion engine cylinder, piston, crankcase, and oil pan in accordance with a first embodiment of the present invention.

Reference will now be made in detail to embodiments of the present invention, examples of which are illustrated in the accompanying drawings. With reference to FIG. 1, an end-on partial cross-sectional view is provided of an engine piston 36, cylinder head 37, engine block 38, crankcase 39, and oil reservoir 45, in accordance with a first embodiment of the invention. The engine may be oriented with the cylinder head 37 at an upper end, i.e., with the center of mass of the cylinder head further away from the center of gravity of the local gravitationally dominant terrestrial body (e.g., Earth) than the center of mass of the engine block 38.

The cylinder head 37 may be sealed to the engine block 38. The upper walls of the cylinder head 37 and the engine block 38 define a combustion chamber 21 above the piston 36. The seal between the cylinder head 37 and the engine block 38 prevents or limits air or other gases from escaping from the combustion chamber 21. The cylinder head 37 may have a plurality of apertures provided in it to receive various engine components. A first aperture may provide an intake port that may be selectively blocked and unblocked by an intake poppet valve 26. A second aperture may provide an exhaust port that may be selectively blocked and unblocked by an exhaust poppet valve 32. A third aperture may receive a spark plug 53 for spark ignition engines, or a glow plug for Diesel engines. A fourth aperture may receive a direct fuel injector 54. Additional apertures may be provided in the cylinder head 37 for additional intake valves, exhaust valves, auxiliary valves, spark plugs, glow plugs, fuel injectors and/or water injectors. Preferably, the intake poppet valve(s) 26, exhaust poppet valve(s) 32, spark plug(s) 53, direct fuel injector(s) 54, and water injector (not shown), are provided at or near central locations of the cylinder head 37.

The elongated stems of the intake poppet valve 26 and the exhaust poppet valve may be biased toward their respective cam followers 29 by valve springs 27. The cam followers 29 may pivot about hydraulic lifters 30 under the influence of the cams 28. The hydraulic lifters 30 may be controlled to provide Variable Valve Actuation, although this is not required, in which case the hydraulic lifters may be used to simply adjust valve lash. The valve springs 27 may bias the intake and exhaust poppet valves 26 and 32 into closed positions when their respective cams 28 are at base circle with respect to the cam followers 29. It is appreciated that the foregoing described valve train arrangement may be modified without departing from the intended scope of the present invention. Different combinations of mechanical, electrical and/or hydraulic components may be employed to actuate the intake and exhaust poppet valves.

The piston 36 may be slidably disposed in the engine block 38 below the cylinder head 37. The piston 36 may have a piston head 22 at an upper end, a lower end, and a side wall or piston skirt 35 extending between the upper end and the lower end of the piston. The piston skirt 35 may be generally non-cylindrically shaped, and the piston head 22 may be domed cooperatively with the upper end wall of the combustion chamber 21. One or more depressions 23 may be formed in the piston head 22. When viewed from above, looking down into the combustion chamber 21, the outer perimeters of the piston skirt 35 and the piston head 22 may have a non-circular cross-sectional shape, preferably a generally rectangular shape with rounded corners. The cylinder may have a matching cross-sectional shape. The term "rectangular" refers to a shape with four straight edges joined at four rounded ninety-degree corners wherein there are at least two opposing pairs of straight edges that are the same length separated by rounded corners, or all four of the straight edges are the same length (square) separated by rounded ninety-degree corners. The dimension of the rounded corners may vary, and in some embodiments may occupy a dominant portion of the rectangle side.

The curvature of the outer surface of the piston head 22 may be preferably hemispherical or semi-hemispherical, and may have a substantially constant radius of curvature. The upper dome of the piston head 22 may extend between diametrically opposed edges of the piston skirt 35, and thus the diameters of the piston skirt 35 and the upper dome may be substantially the same. The upper dome may have an upper-most crown or apex that may be located at a point spaced from or coincident with a reference axial centerline extending through the centers of the upper dome and piston skirt 35. In other words, the apex may be off-center and proximal to the one side of the engine cylinder in which the piston 36 is disposed, or may be on-center relative to the engine cylinder.

Figure 2:
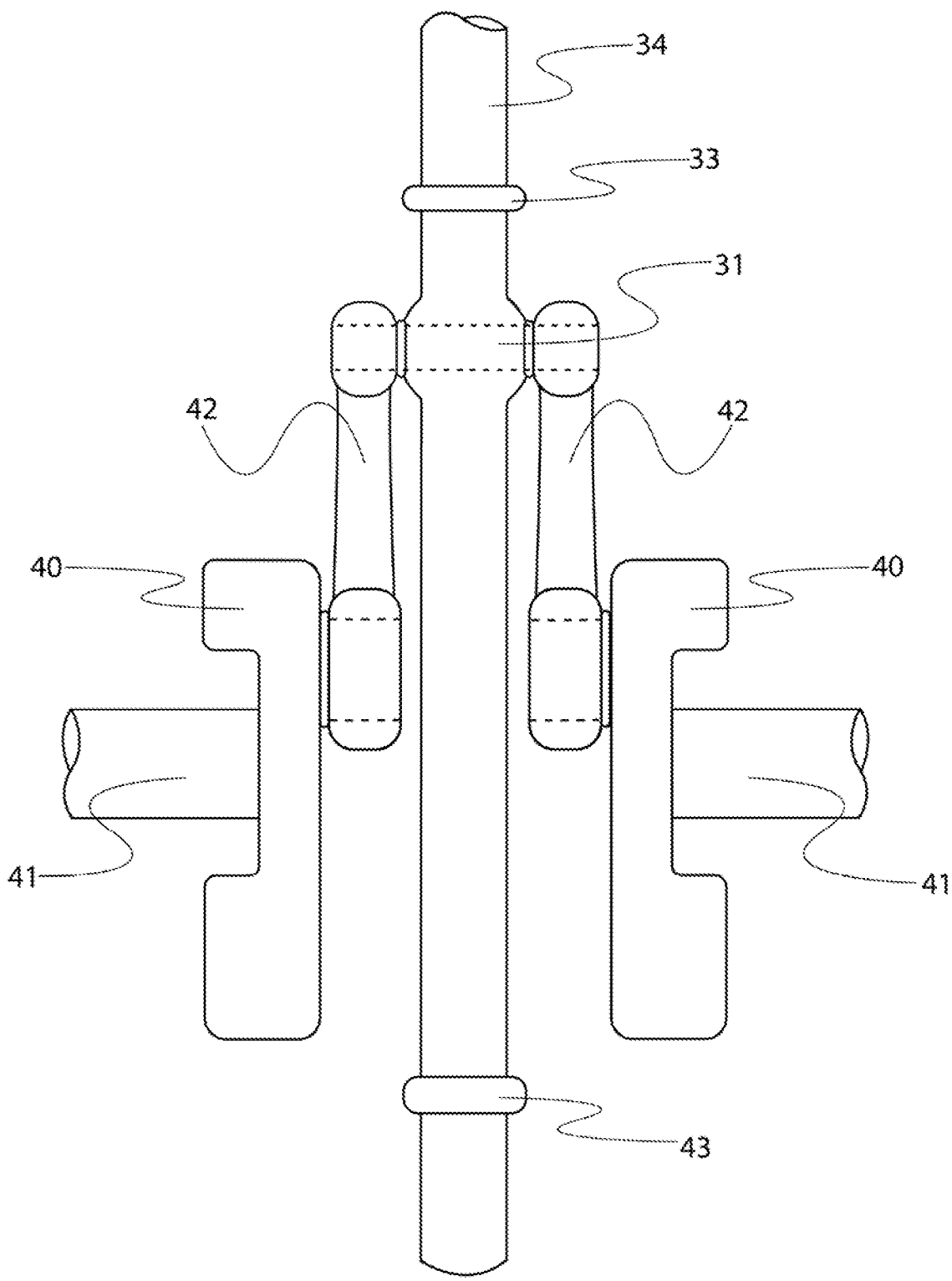
FIG. 2 is a side view of a crankshaft, connecting rod, and cross-head assembly in accordance with the first embodiment of the present invention.

With reference to FIGS. 1 and 2, the piston 36 may be attached to a cross-head 34 which is slidably received by an upper cross-head guide 33 and a lower cross-head guide 43. The upper cross-head guide 33 and lower cross-head guide 43 constrain the cross-head 34 to purely linear motion. The lower portion of the cross-head 34 may extend past the lower cross-head guide 43 into the oil reservoir 45. Rapid dipping and undipping of the cross-head 34 into the oil reservoir 45 may create oil splash that lubricates the engine components in the crankcase 39. The upper cross-head guide 33 may form a barrier that prevents oil from entering the lower (supercharger) chamber 51 from the crankcase 39, and that prevents gases in the lower chamber from entering the crankcase. One or more drain passages 44 may extend between the crankcase 39 and the oil reservoir 45.

With continued reference to FIGS. 1 and 2, the cross-head 34 may be pivotally connected to two connecting rods 42 by a wrist pin 31 located between the upper cross-head guide 33 and the lower cross-head guide 43. Each connecting rod 42 is aligned parallel with and rigidly connected to the other connecting rod by the wrist pin 31. The connecting rod 42 and wrist pin 31 may be connected using a weld, pin, press fit, interlocking shape, or locking screws, for example. The wrist pin 31 may have an axial dimension that is parallel with, but spaced from, an axial dimension of the crankshaft 41. The two connecting rods 42 may be disposed on opposite sides of the cross-head 34. The ends of the connecting rods 42 that are distal from the wrist pin 31 may be pivotally connected to respective cranks 40 disposed on opposite sides of the cross-head 34. Each of the cranks 40 may be connected to a split crankshaft comprised of two coaxial crankshaft sections 41 disposed on opposite sides of the cross-head 34. Each crank 40 may have an offset (i.e. the distance between (i) the pivot point of the crank 40 and connecting rod 42 and (ii) the axis of the crankshaft 41) equal to half of the appropriate stroke length of the piston 36.

Figure 6:
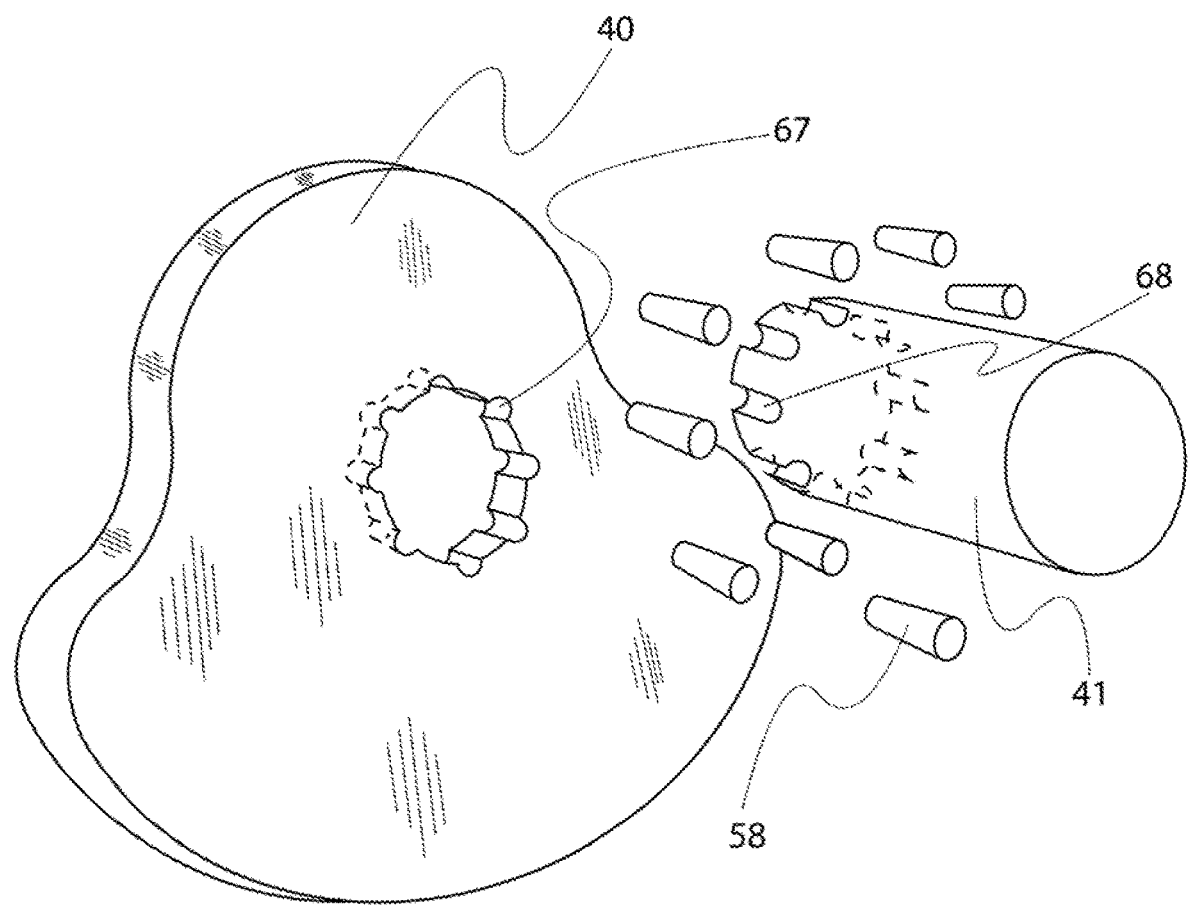
FIG. 6 is an exploded view of a crank, crankshaft, and joining elements in accordance with the first embodiment of the present invention.

FIG. 6 illustrates a preferred manner of connecting a crank 40 to a crankshaft section 41. The bore provided in the crank 40 for receiving the crankshaft 41 may have a plurality of crank keyholes 67 formed in the bore side wall. The crankshaft 41 may have a matching set of crankshaft keyholes 68 formed around the outer circumference of one end of the crankshaft. Pins/keys 58 may be inserted into either the crank keyholes 67 or the crankshaft keyholes 68, after which the crank 40 and crankshaft 41 may be press fit together to form a rigidly connected crank and crankshaft assembly. The number, size, shape, and material of the pins/keys 58 may be selected to allow the pins/keys to shear with acceptable damage if the assembly is subjected to detrimental levels of acceleration, deceleration, non-circular motion, or over-limit torque. Shearing pins/keys 58 may permit the connected crank 40 and crankshaft 41 to disengage and prevent transmission of unacceptable forces to other components in the engine and drive train. Shearing pins/keys 58 may allow the assembly to be more easily repaired with low cost parts after a failure.

Figure 7A:
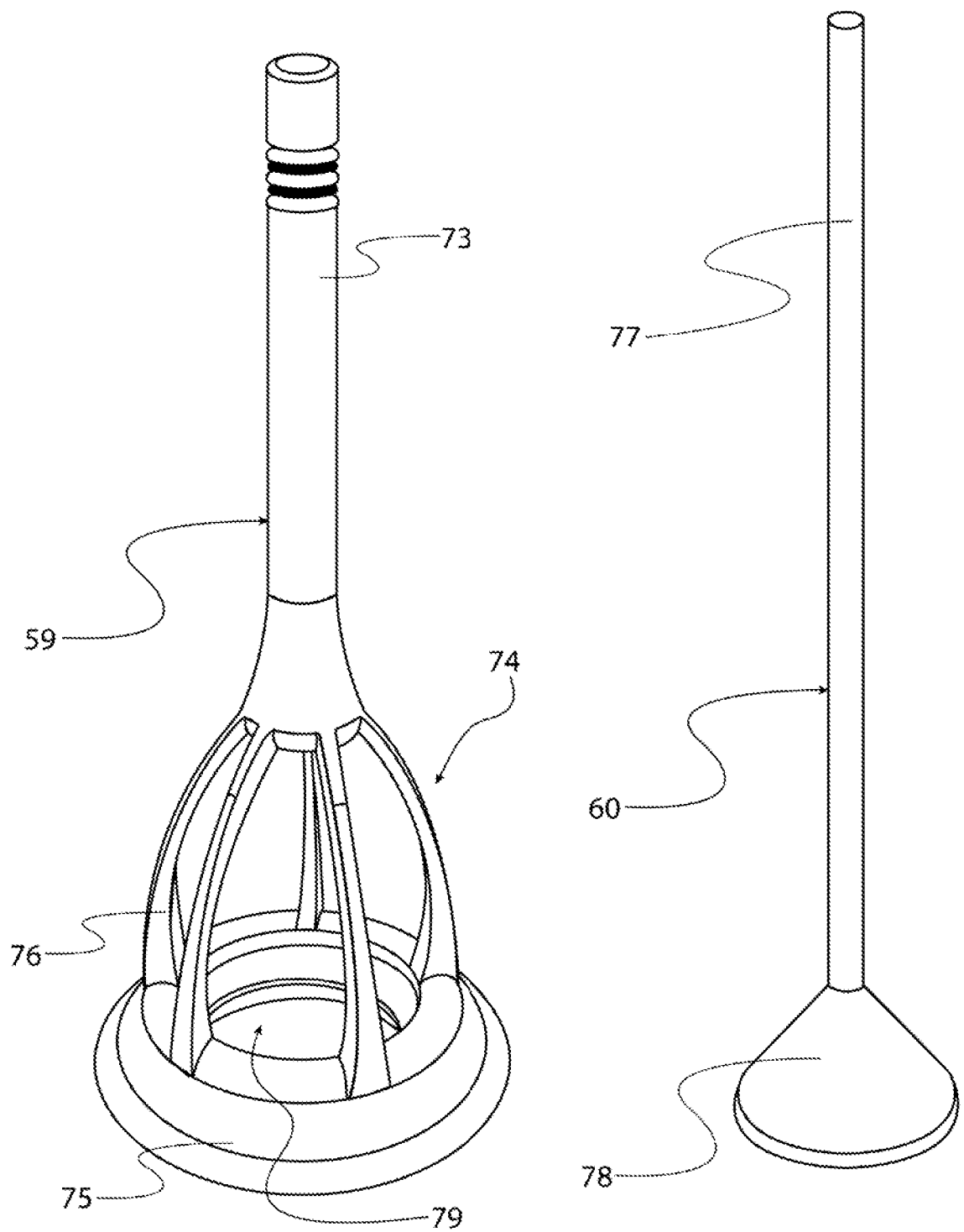
FIG. 7A is an isometric view of the separated outer and inner elements, respectively, of a multi-stage telescoping poppet valve in accordance with the first embodiment of the present invention.

It is appreciated that the engine shown in FIG. 1 may include conventional intake and exhaust poppet valves. However, FIGS. 7A-7E, inclusive, illustrate an alternative multi-stage engine poppet valve for use as the intake poppet valve(s) 26 and/or exhaust poppet valve(s) 32 in various embodiments of the present invention. With reference to FIG. 7A, the multi-stage poppet valve may include a cooperatively shaped and sized inner poppet valve 60 and an outer poppet valve 59. The outer poppet valve 59 may have an upper elongated hollow stem 73, a lower valve head/seat 75, and an intermediary cage body 74. The cage body 74 may include a plurality of fingers 76 that connect the upper elongated hollow stem 73 to the lower valve head/seat 75. The lower valve head/seat 75 of the outer poppet valve 59 may have a port or opening 79 extending through it from a lower face to the cage body 74. The inner poppet valve 60 may have an upper elongated stem 77 and a lower valve head 78.

Figure 7B:
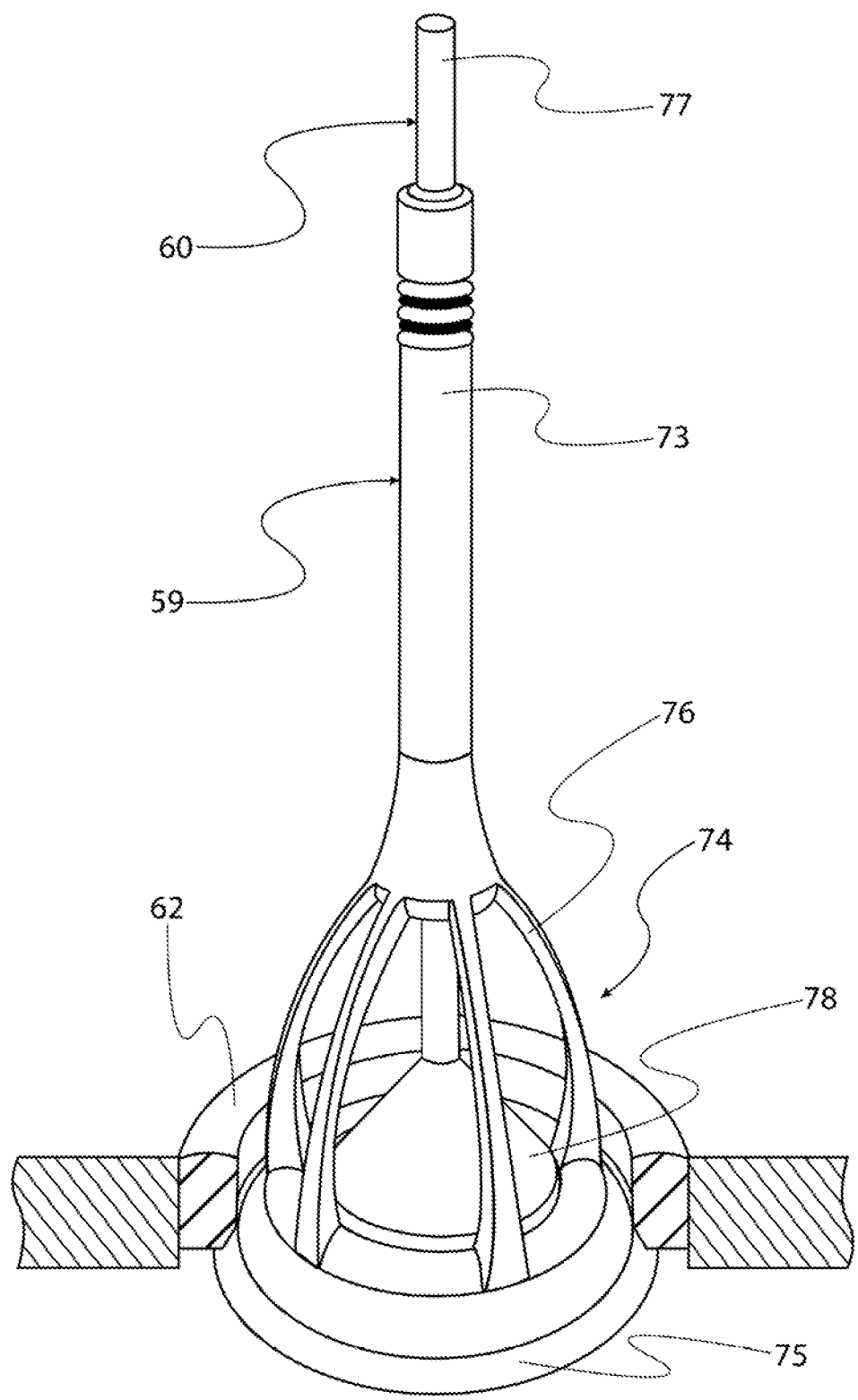
FIG. 7B is an isometric, partial cross-sectional, view of a multi-stage telescoping poppet valve constructed of outer and inner elements shown in FIG. 7A in a valve-closed position.
Figure 7C:
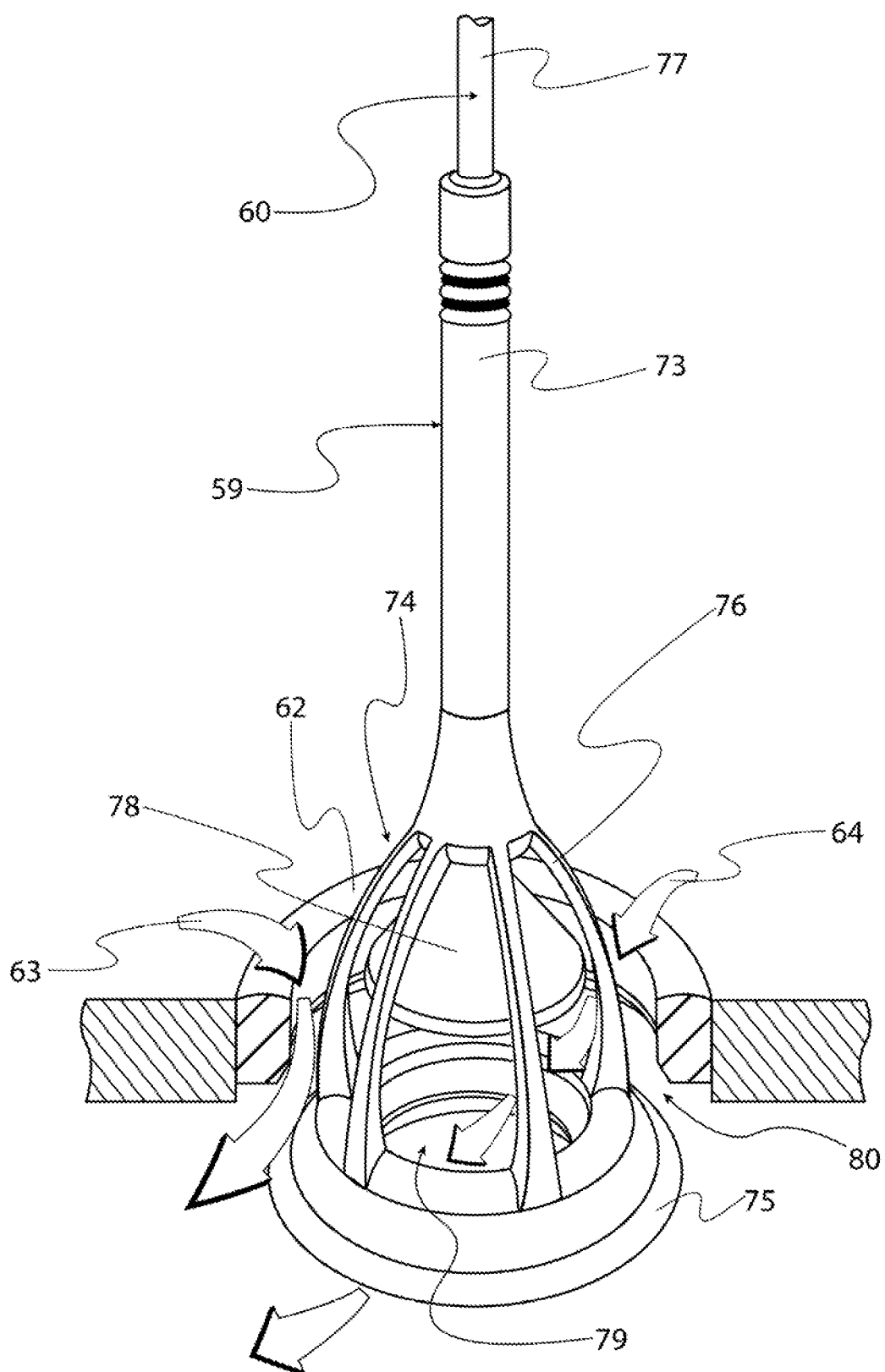
FIG. 7C is an isometric, partial cross-sectional, view of the multi-stage telescoping poppet valve of FIG. 7B in a valve-opened position.
Figure 7D:
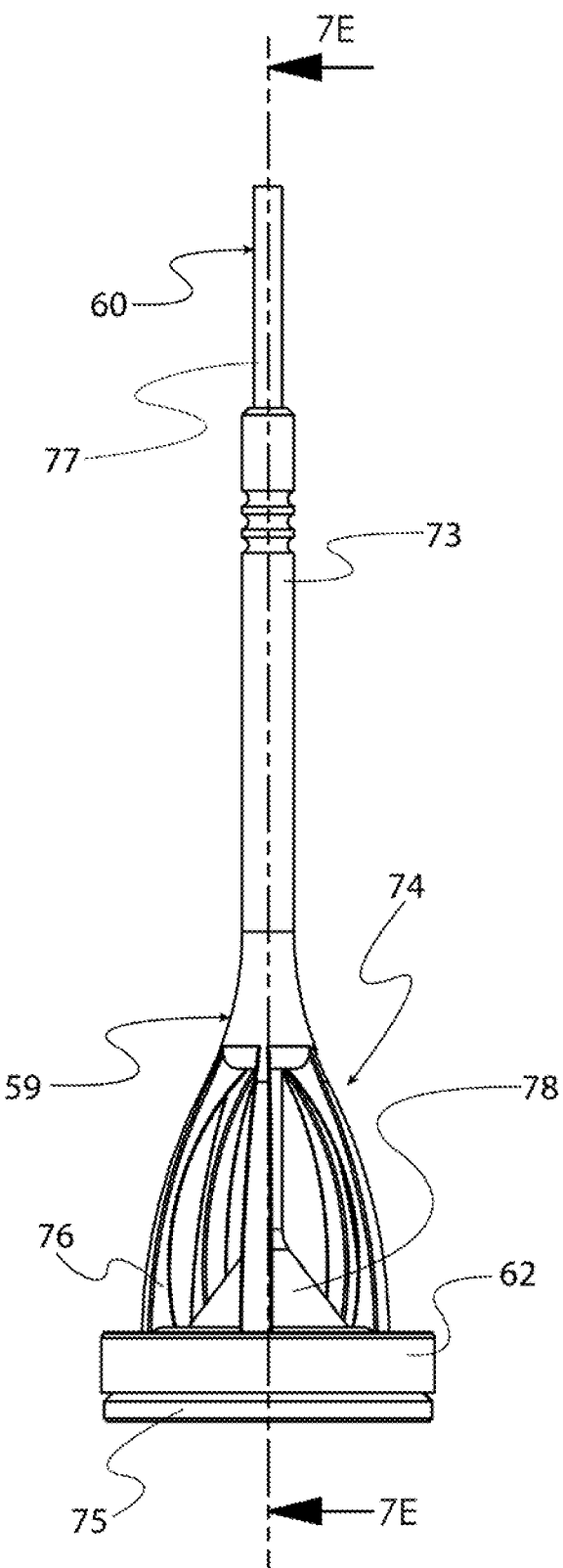
FIG. 7D is a side view of the multi-stage telescoping poppet valve of FIG. 7B.
Figure 7E:
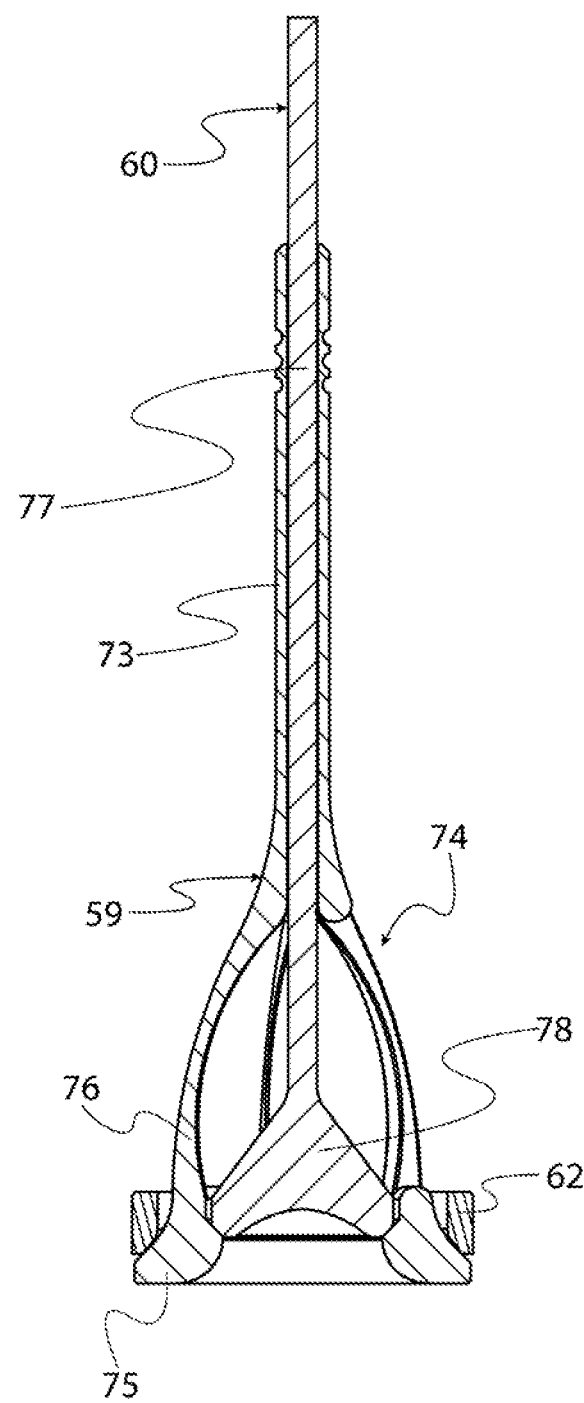
FIG. 7E is a cross-sectional view of the multi-stage telescoping poppet valve of FIG. 7D.

With reference to FIGS. 7B, 7D and 7E, the stem 77 of the inner poppet valve 60 is configured to slide securely within the hollow stem 73 of the outer poppet valve 59. The head 78 of the inner poppet valve 60 is configured to seal against the head/seat 75 of the outer poppet valve 59 to block the port 79 when the inner poppet valve is in a valve-closed position. The head/seat 75 of the outer poppet valve 59 is configured to seal against the valve seat 62 to block the port 80 when the outer poppet valve is in a valve-closed position. When the outer poppet valve 59 and inner poppet valve 60 are in valve-closed positions, as shown, the flow of working fluid through ports 79 and 80 is prevented. The outer poppet valve 59 encompasses the inner poppet valve 60 and the outer poppet valve head/seat 75 mates with a sealing surface on the inner poppet valve head 78.

With reference to FIG. 7C, the outer poppet valve 59 and the inner poppet valve 60 are shown in a valve-opened position for the passage of working fluid past the valve. Actuation of the outer poppet valve 59 causes the outer poppet valve to translate downward away from the valve seat 62, and (optional) actuation of the inner poppet valve 60 causes it to translate upward away from the outer poppet valve head/seat 75. These actuations, together or independently, permit working fluid to flow past the valve as the result of an outer flow 63 and/or an inner flow 64.

The inner poppet valve 60 may be manufactured by forging using dies to obtain stronger structures and better grain orientation, or turned on a lathe, for example. The outer poppet valve 59 may be progressively forged as a flat piece and then forged and bent progressively until U-shaped similar to the way sheet metal parts are shaped into 3D structures. The inner poppet valve 60 and outer poppet valve 59 assembly may be completed by inserting the inner poppet valve into the U-shaped outer poppet valve and pressing it closed. The resulting seam may be left slightly open or welded followed by a grind and polish process.

Alternatively, the inner poppet valve 60 may be made of two or more pieces where the stem 77 is separate from the head 78, for example. The inner poppet valve head 77 piece or pieces may be inserted through openings in the outer valve 59 cage body 74 and connected to the inner poppet valve 60 stem 77 using threads, pins, press-fit, welding, or other connection type. In other alternative examples, the outer poppet valve 59 and inner poppet valve 60 assembly may be manufactured using a laser sinter (rapid manufacturing/3D print) process, or investment casting/lost wax process, or fine die casting using cores. Other methods of manufacturing the described multi-stage valve may be employed without departing from the intended scope of the invention.

Figure 8A:
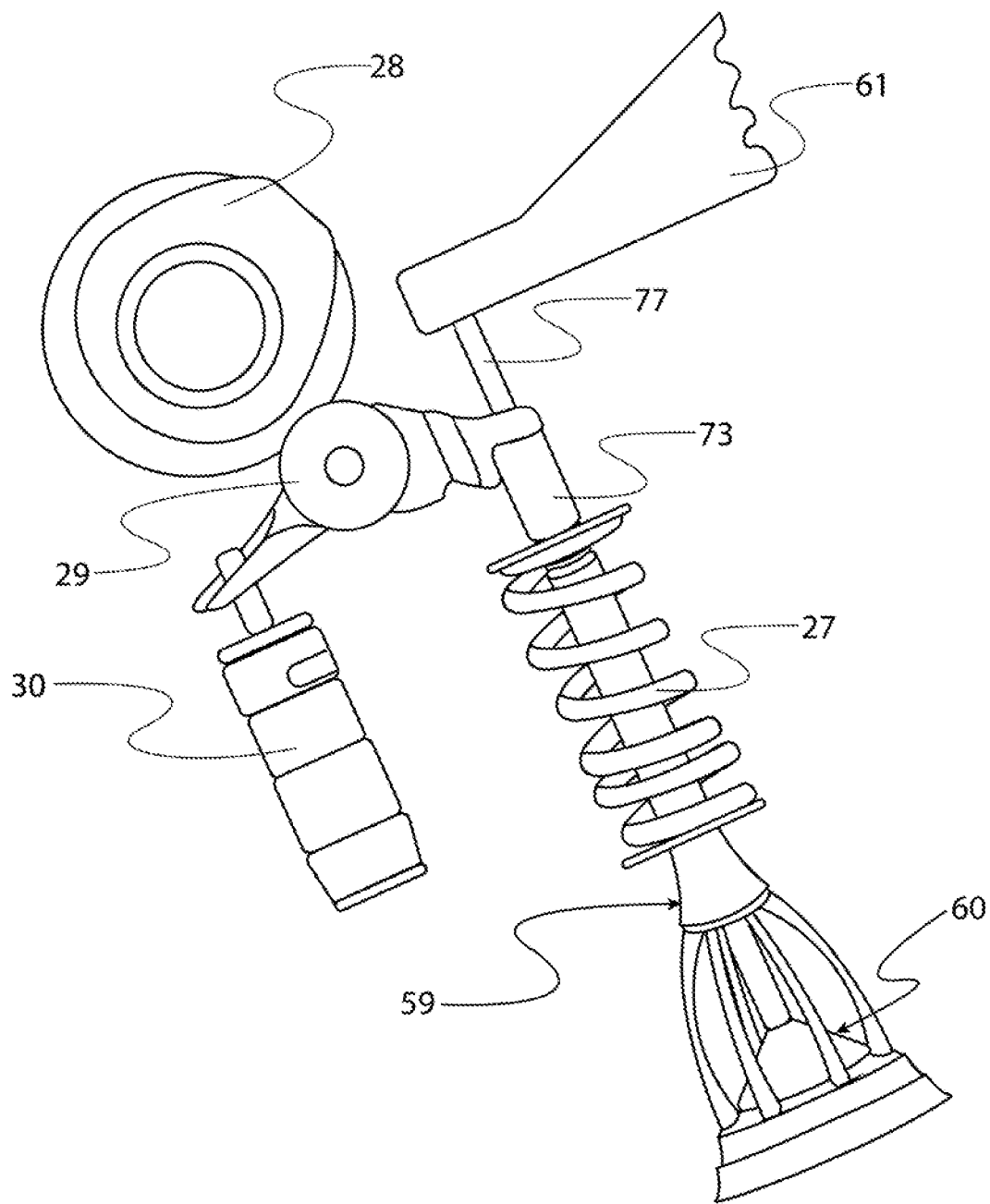
FIG. 8A is a side view of the poppet valve of FIGS. 7A-7E and a valve actuation system for the poppet valve in accordance with the first embodiment of the present invention.

FIG. 8A illustrates an example of a valve actuation system that may be used to actuate a multi-stage poppet valve having an outer poppet valve 59 and an inner poppet valve 60 in accordance with the first embodiment of the present invention. A hydraulic lifter 30 may be supported at a lower end by a fixed structure such as the cylinder head. The upper end of the hydraulic lifter 30 may pivotally support the first end of a cam follower 29. The cam follower 29 may contact the cam 28. The end of the cam follower 29 distal from the lifter 30 may contact the outer poppet valve stem 73 such that downward motion of the cam follower end pushes the outer poppet valve stem downward against the upward bias of the valve spring 27. The cam follower 29 end may be forked so that its downward motion does not cause the inner poppet valve stem 77 to move. The inner poppet valve 60, including its stem 77, may be held in a fixed position by a fixed mount 61.

The position of the pivot point between the lifter 30 and the cam follower 29 relative to the cam 28 may be adjusted during engine operation to adjust lash. The pivot point may also be adjusted rapidly on an engine cycle-to-cycle basis to provide variable valve actuation. When the pivot point is held in a fixed position, even if only briefly, rotation of the cam 28 pushes the cam follower 29 downward about the pivot point, which in turn pushes the outer poppet valve stem 73 downward. The downward motion of the outer poppet valve stem 73 pushes the valve head/seat 75 downward and away from the seat 62 and the inner poppet valve head 78

(see FIG. 7C). This manner of valve actuation may be used to provide any needed valve opening events.

With renewed reference to FIG. 1, the piston 36 may be disposed within the combustion chamber 21 such that the piston skirt 35 is closely aligned with, but uniformly spaced from and parallel to, the side wall of the combustion chamber. The upper end wall and side wall of the combustion chamber 21, together with the piston head 22, may form a working space or compression area 24 which may receive a working fluid. The piston 36 may be configured to slide within the combustion chamber 21, reciprocally towards and away from the combustion chamber 21 upper end wall.

With reference to FIGS. 1, 4A, 4B and 4C, the piston skirt 35 may have a ringless fluid sealing system 25 comprised of a plurality of recesses or pockets separated by lands forming a field of pockets. Preferably, the pockets may be of like shape and dimension in terms of shape at the mouth, shape at the base, height, width, diameter, depth, and/or volume. Preferably, the piston skirt 35 is a hollow wall structure (i.e., not solid between opposing outer points) and the pockets are formed in piston skirt but do not extend through the piston skirt to the hollow interior of the piston 36. The pockets in the field 25 may be arranged in at least one circumferential row, or more preferably, in a grid pattern consisting of two or more vertically spaced rows of pockets. The number, shape, size and arrangement of the lands and pockets in the field 25 shown in the drawing figures was selected for ease of discussion and illustration and is not considered limiting.

A seal or seal equivalent may be produced over the expanse of the piston skirt 35, from top to bottom, due to the presence of the pockets and lands arranged in an appropriate sealing system field 25 on the face of the piston skirt. The seal or its equivalent may be generated as the result of the pressure difference of the working fluid between the combustion chamber 21 and the lower chamber 51. As the piston 36 moves upward in the combustion chamber 21, the pressure and temperature of the working fluid in the working space 24 may rise and produce a working fluid pressure differential between the combustion chamber 21 and the lower chamber 51. This pressure differential may cause the working fluid in the space between the piston skirt 35 side wall and the chamber side wall, i.e., flow in the seal gap, to flow towards the lower chamber 51. Flow of the working fluid through the seal gap may induce a local Venturi effect at each pocket in the field 25, which may locally increase the speed and decrease the pressure of the working fluid. The speed and pressure change of the working fluid may be a function of the practical small clearance distance between the piston skirt 35 side wall and the combustion chamber 21 side wall.

Figure 4A:
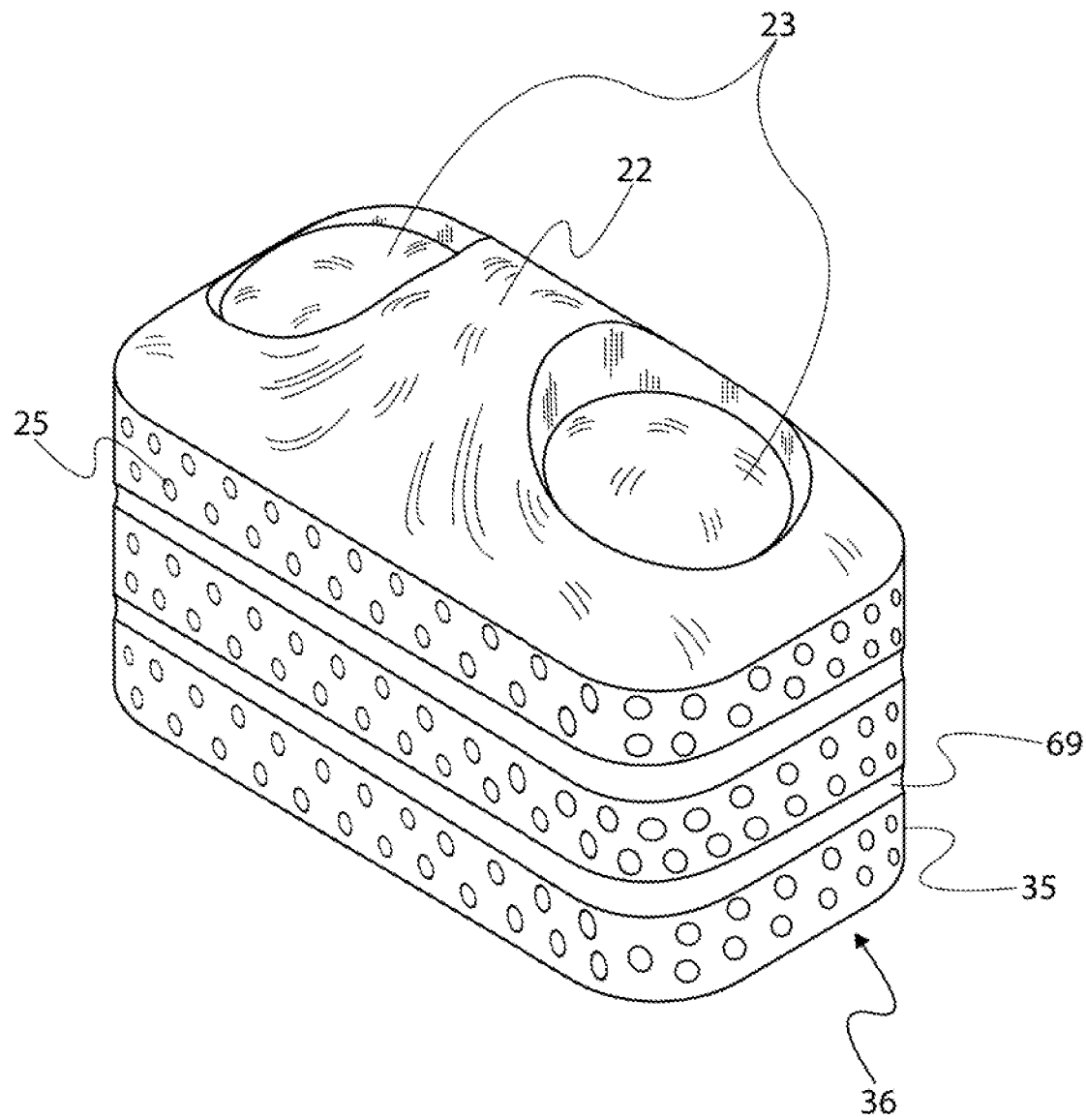
FIG. 4A is an isometric view of a rectangular piston in accordance with the first embodiment of the present invention.

With continued reference to FIGS. 1, 4A. 4B and 4C, the pockets preferably may have relatively sharp edges at the junction with the face of the piston skirt 35, i.e., at the junction with the lands. As the working fluid flows over the sharp edge of a pocket, a decrease in local pressure may occur due to turbulence. As a result, the working fluid may expand creating a momentary decrease in pressure and an increase of localized turbulence. Further working fluid flowing over and into each successive pocket may begin a cycle wherein each pocket serves as a Helmholtz-like resonator or resonating column (dependent upon pocket shape deployed), which may cause the working fluid to be drawn into and expelled out of the pocket at a definable frequency creating further localized turbulence.

The resulting turbulence may be a function of the physical properties of the working fluid in the system and the diameter (or height and width), geometry, relational location, and depth of each individual pocket in the field 25. The resulting turbulence may also be a function of the practical small clearance distance or seal gap due to the ratio of the spatial volume above each land to the spatial volume above and within each pocket. This localized turbulence may interact with the flowing working fluid and generate a vortex motion that impedes further flow of the working fluid. The decrease in flow may momentarily decrease the resonance effect, which in turn may momentarily decrease the localized turbulence, which then may allow the flow rate of the working fluid to momentarily increase again.

When the piston 36 is on an upward stroke, the working fluid which has passed over the pockets in the upper most row (closest to the piston head 22) may next encounter the pockets in the adjacent row of the pocket field 25 where the described turbulence phenomena repeats, but at a lower starting pressure. This process may repeat as the working fluid passes over successive rows of the sealing system pocket field 25 with successively relatively decreased starting pressure until the local pressure in the seal gap is reduced to the pressure level of the working fluid contained in the lower chamber 51. The repeating cycle of pressure reduction from pocket to pocket in the field 25 may create a seal or the effective equivalent of a seal since no working fluid will flow past the point at which the local pressure in the seal gap is at or below the pressure of the working fluid in the lower chamber 51.

The localized turbulence at each pocket may decrease with time due to the gradual leaking allowed by the resonant action of the pockets. Therefore, the localized turbulence may also be a function of the rate of motion of the piston 36 relative to the combustion chamber 21 side wall, as the motion may be responsible for the pressure changes around the piston 36 in the combustion chamber. The effectiveness of the sealing system may require working fluid pressures that fluctuate to provide energetic flows into the sealing system field 25 by providing a consistent flow in and out of the pockets, thereby maintaining the effectiveness of the sealing system.

The rate of the sealing system leakage may be modified by using different land spacing patterns and pocket geometries within the sealing system field 25. The land spacing may be selected to induce the pockets to provide counter flow to prior (upper) pockets while forward (lower) pockets may prevent fluid flow to induce internally decaying self-reinforcing oscillations within the sealing system field 25.

The effectiveness of the sealing system field 25 for a particular application may be a function of the outside dimensions of the sealing system field in addition to the design parameters of the individual pockets. The seal efficiency may be improved by modifying the geometry of some or all of the pockets to include a convergent area at the inner base of the pockets and a divergent area at the mouth of the pockets. A de Laval nozzle effect may be produced at the pockets using a convergent area and a larger divergent area to form a resonant cavity at the bottom of the pockets, which may create greater localized turbulence due to localized supersonic working fluid movement.

With reference to FIG. 1, the piston 36 may self-center within the combustion chamber 21 due to the tendency of the pressure surrounding the piston to normalize at any given vertical point on the piston skirt 35. For example, when the practical small clearance distance, i.e., the seal gap, between the piston 36 and the surrounding cylinder are momentarily unequal about a central axis, a total normalizing force may be generated by the pressures acting on the surface area of the opposing sides of the piston. This total normalizing force may urge the piston 36 to be centrally located within the cylinder with a dampened oscillation about the central axis. With additional reference to FIGS. 4A and 4C, the time required for the normalizing force to return the piston to the center of the cylinder may be decreased by adding one or more equalizing grooves 69. The equalizing grooves 69 may be disposed on land areas, or between pockets, or both on land areas and between pockets, or in the side wall of the chamber 21 opposing the pockets to allow a more uniform distribution of the forces more rapidly on the surface employing the sealing system.

It is appreciated that the field 25 of pockets, and/or the equalizing grooves 69, described as being formed on or in the surface of the piston 36 may instead be formed on or in the surface opposing the piston in alternative embodiments. It is also appreciated that the field 25 of pockets described as being formed on or in the surface of the piston 36 may also be formed on or in the surface opposing the piston in addition to being formed on or in the surface of the piston. It is also appreciated that the field of pockets may be used on pistons like those illustrated in FIGS. 4A, 4B and 4C, or on other pistons of different (i.e., non-rectangular) shape, with or without depressions 23.

With reference to FIGS. 1, 4A, 4B and 4C, details of the depressions 23 formed in the piston 36 are illustrated. There may be one depression 23 (left side of figure) provided for a corresponding intake poppet valve 26 and another depression 23 (right side of figure) provided for a corresponding exhaust poppet valve 32. The depressions 23 may each have a continuous, generally circular, side wall extending between an upper lip and a depression floor. Each of the depression side walls may be curved in two dimensions—from upper lip to depression floor, and in a plane substantially parallel to the depression floor so as to be generally circular when viewed from above. Alternatively, the side walls may be ramped in the floor to upper lip dimension instead of curved in that direction. The height of the depression side walls (i.e., the vertical distance between the upper lip and the depression floor) may vary along its length, preferably having a maximum height at a point proximal to the center of the piston 36 and a minimum height at a point distal from the center of the piston. The curved shape of the depression 23 side walls in the upper lip to depression floor direction may vary, but is preferably spherical. The depression floors may be generally flat or curved to a lesser degree than the side walls. The size of the depressions 23 may also vary, but preferably the depressions have a larger diameter at the upper lip than at the depression floor.

Figure 4B:
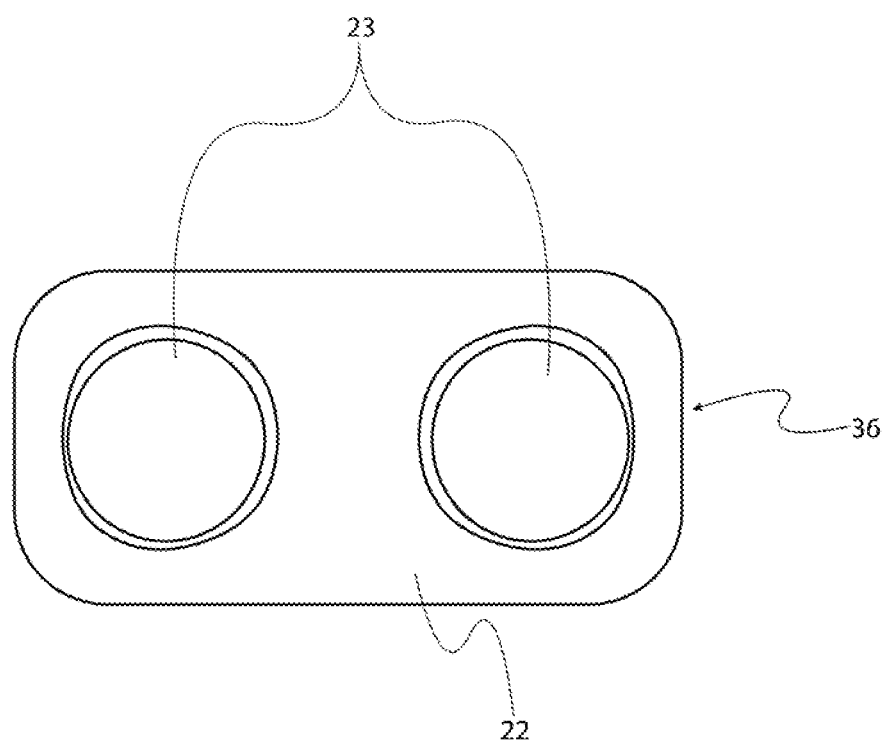
FIG. 4B is a top plan view of the rectangular piston of FIG. 4A.
Figure 4C:
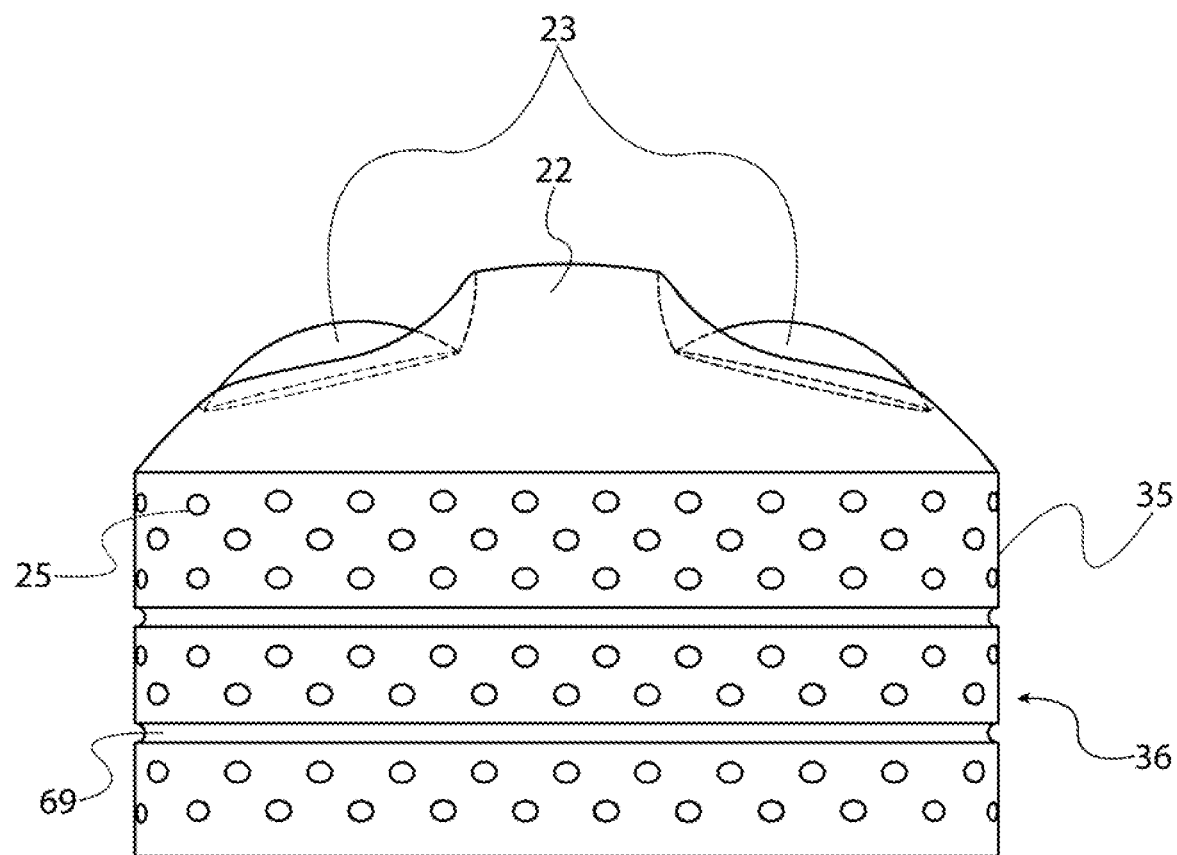
FIG. 4C is a side, partial cross-sectional, view of the rectangular piston of FIG. 4A.

The depression floor of each depression 23 may be set at an angle relative to the straight edge formed by the junction of the piston skirt 35 with the piston head 22, as shown in FIG. 4C. The angle at which the depression floor is set may match the angle made between the aforementioned straight edge and the lower edge of the corresponding intake poppet valve 26 or exhaust poppet valve 32 for the depression 23. The depressions 23 may be located on the piston head 22 and sized such that the corresponding intake valve 26 or exhaust valve 32 may operate and if needed, extend into the depression, without making contact with the piston 36. The intake poppet valve 26 and/or exhaust poppet valve 32 may be positioned above their respective depression 23 such that the egress path for working fluid squished between the poppet valve and the depression when the two are moving towards each other is larger near the center of the piston 36 than elsewhere. The shapes and/or sizes of the depressions 23 formed in the same piston 36 may be different from each other, and when two opposing depressions 23 are provided, they may be located equidistant from the center of the piston 36, as shown, or alternatively, set at different distances from the center of the piston. The depressions 23 are preferably configured to improve the flow of working fluid into and out of the combustion chamber 21. It is appreciated that the depressions 23 may be used on pistons like those illustrated in FIGS. 4A, 4B and 4C, or on other pistons of different (i.e., non-rectangular) shape.

The engine shown in FIG. 1 may operate as follows for positive power engine operation. The intake poppet valve 26 is opened on the intake stroke of the piston 36 by the intake side cam 28 and cam follower 29 against the closing bias of the valve spring 27. At the same time, the exhaust poppet valve 32 may be in the process of closing under the control of the exhaust side cam 28 and cam follower 29. The open intake poppet valve 26 allows air or charge to blow-down into the upper chamber 21 of the cylinder and aids the scavenging and evacuation of exhaust gases through the closing, but not yet closed, exhaust poppet valve 32. As the intake stroke continues, the exhaust poppet valve 32 closes while additional air or charge is drawn into the upper chamber 21 from the intake poppet valve 26. The charge may be developed outside of the cylinder near the intake poppet valve 26 passage by a port fuel injector 55 (shown in FIG. 3) with appropriate timing to allow the fuel to adequately vaporize and mix near the intake valve passage. The charge also may be developed within the upper chamber 21 by a direct fuel injector 54. The direct fuel injector may operate during either or both of the piston 36 movement directions. Alternatively, a combination of the two fuel injection strategies, port injection and direct injection, may be used. The combination strategy may be important for high RPM operation because there may be insufficient time for proper atomization, vaporization, and mixing of the fuel with gasses when only direct injection is used at high RPMs.

The intake event ends as the piston 36 passes bottom dead center position and begins its ascent in the cylinder. As the piston 36 rises, the charge in the cylinder is compressed in the upper chamber 21. Squish and swirl may be created above the hemispherical crown of the piston 36 by depressions 23. Turbulence may be induced in the form of squish and swirl as the charge is forced into the compression area 24 where the spark plug 53 is allowed to come into intimate contact with the compressed charge. The spark plug 53 ignites the charge at the appropriate time or times and allows the flame front to propagate through the charge in the centrally contained volume. This promotes a more uniform flame front travel and subsequent faster flame front propagation as the gasses are agitated and expand, urging the piston 36 downward. This transfers the thermodynamic chemical energy through pressure acting upon the surface of the piston 36, which transfers the energy through the crosshead 34 into the connecting rod 42 by way of the wrist pin 31, then through the crank 40, to ultimately turn the crankshaft 41. The momentum stored within the crank 40 carries the mechanism through bottom dead center and urges the piston 36 upwards as the valve train opens the exhaust poppet valve 32 to allow the evacuation of the gasses. This cycle continues ad infinitum as the engine runs. Oil is delivered from the oil reservoir 45 to bearings and seals as necessary via conventional means of a pump and passages (not illustrated) within the appropriate elements of the engine and within the one or more-piece engine block 38 and crank case 39, which also has drain passages 44 to allow the oil return to the oil reservoir 45.

Figure 3:
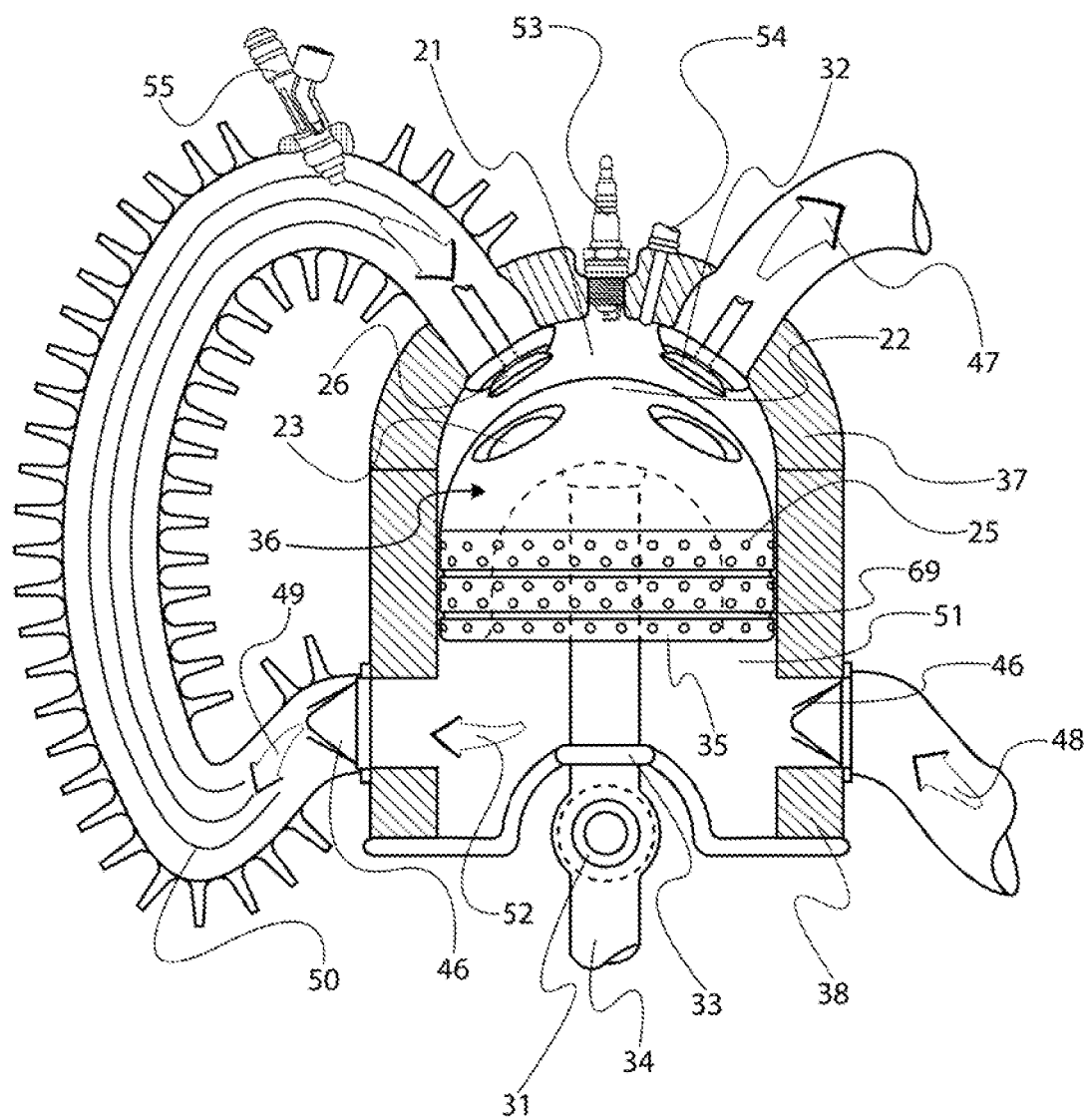
FIG. 3 is a partial cross-sectional view of an internal combustion engine cylinder, piston, and intake supercharger/intercooler in accordance with a second embodiment of the present invention.

FIG. 3 illustrates a second engine embodiment of the present invention. In the FIG. 3 embodiment, two openings are formed in the side wall of the sealed lower (supercharger) chamber 51 formed between the lower edge of the piston skirt 35 and the upper cross-head guide 33. Each opening is provided with a one-way reed valve 46. The first one-way valve 46 permits working fluid (e.g., air) to flow from a source of fresh air 48 into the lower chamber 51, but not in the reverse direction to any substantial degree. The second one-way valve 46 permits the working fluid 52 to be pumped from the lower chamber 51 into an intercooler 50 where it is stored as compressed working fluid 49. The compressed air 49 may be cooled and stored until needed. The second one-way valve 46 prevents or limits back flow of working fluid from the intercooler 50 to the lower chamber 51. A port fuel injector 55 may inject fuel into the compressed air 49. Thereafter, the compressed working fluid or air 49 and fuel mixture in the intercooler 50 may flow into the combustion chamber 21 under the control of the intake poppet valve 26.

The flow of working fluid progressively from the source of fresh air 48 to the lower chamber 51, and from the lower chamber 51 to the intercooler 50, results from the pumping motion of the piston 36. When the piston 36 is stroking upward, the resulting vacuum force draws working fluid from the fresh air source 48 through the first one-way valve 46 while at the same time drawing the second one-way valve shut. When the piston 36 strokes downward, the resulting compressive force pushes the working fluid 52 from the lower chamber 51 past the second one-way valve 46 into the intercooler 50 while at the same time pushing the first one-way valve 46 closed. The upward motion of the piston 36 pushes exhaust gases 47 past the exhaust poppet valve 32. It is appreciated that a sealed lower chamber 51 with two one-way check valves 46 may be used on engines having different piston shapes, different poppet valves, etc., than those illustrated in FIG. 3.

It is also appreciated that the pumping action of the piston 36, or multiple pistons together, may be used in alternative embodiments to charge a common reservoir or plenum with pressurized air. The pressurized reservoir or plenum may be used to supply air to the intake manifold servicing the one or more intake poppet valves 26.

Figure 5A:
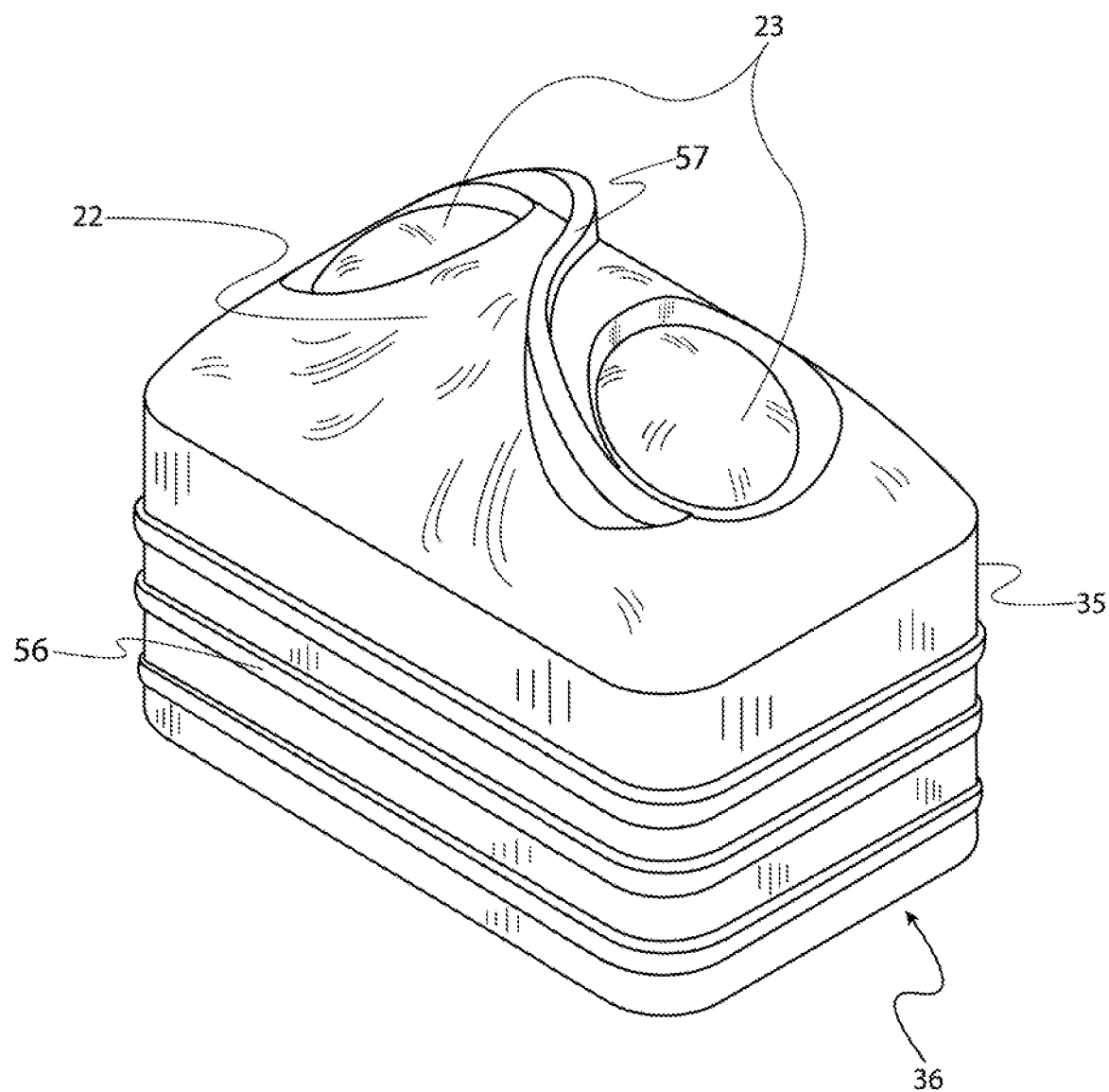
FIG. 5A is an isometric view of a rectangular piston for use in alternative embodiments of the present invention.
Figure 5B:
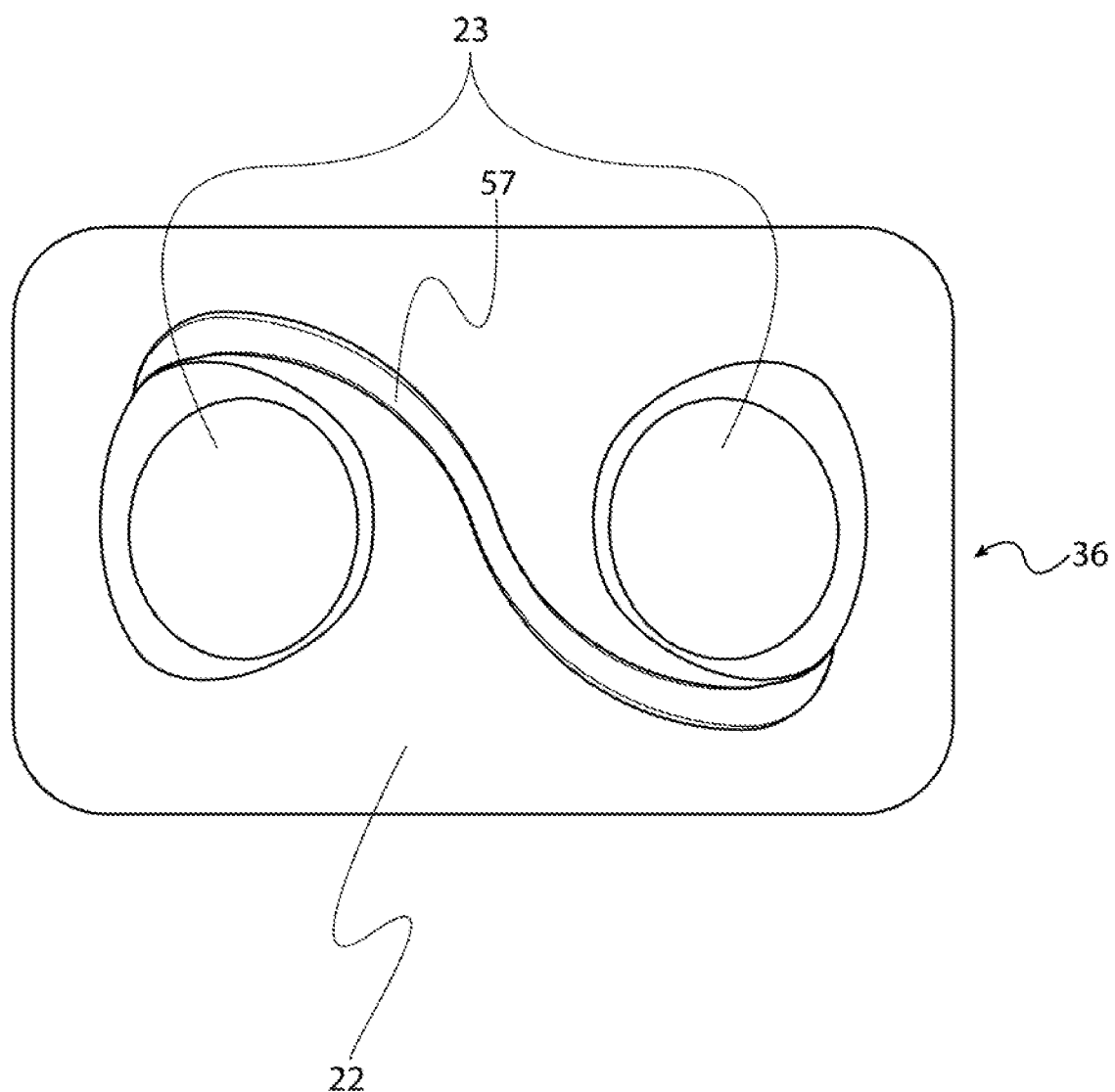
FIG. 5B is a top plan view of the rectangular piston of FIG. 5A.
Figure 5C:
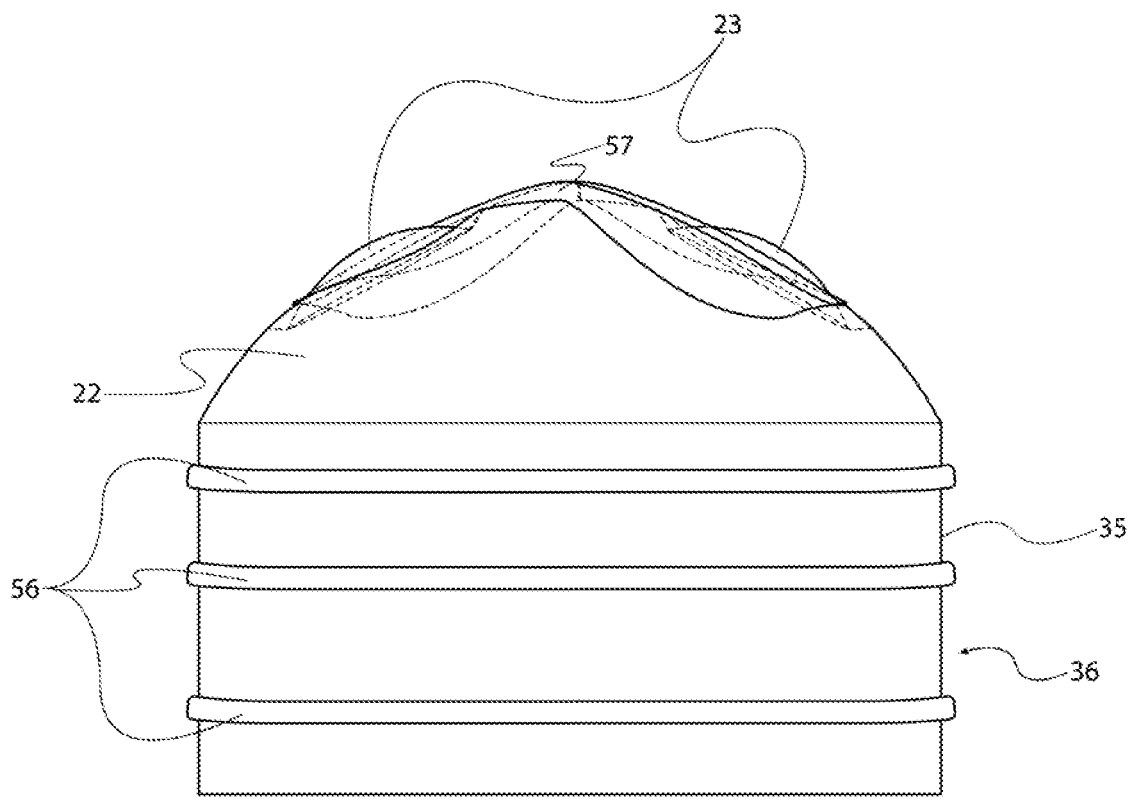
FIG. 5C is a side, partial cross-sectional, view of the rectangular piston of FIG. 5A.

Another alternative engine embodiment of the present invention may include engine pistons of the type illustrated in FIGS. 5A, 5B and 5C, which show a rectangular piston 36 that differs from the piston of FIGS. 4A, 4B and 4C in the following regard. In FIGS. 5A-5C, the piston 36 does not include a ringless fluid sealing system 25 comprised of a field of pockets, but instead includes one or more piston rings 56 to form a seal with the combustion chamber. The piston 36 of FIGS. 5A, 58B and 5C further includes an S-shaped guiding projection 57 that forms a barrier at the surface of the piston head 22 between the two depressions 23. The guiding projection 57 may have a generally rectangular cross-section with a generally flat top surface and two opposing generally flat side walls. The guiding projection 57 may also extend from the upper lip of a first depression 23 at a point proximal to a first side of the piston 36 to the upper lip of a second depression 23 at a point proximal to a second opposite side of the piston to form an S-shape when viewed from above (FIG. 5B). The guiding projection 57 may have ramps that slope up at each end to a maximum height measured from the base of the guiding projection to the top edge or surface. The height of the guiding projection 57 may vary over its length between the end ramps. In a preferred embodiment, the height of the guiding projection 57 may be greatest at points between the end ramps and the center of the S-shape (i.e., center of the piston 36). The S-shape of the guiding projection 57 may be gently curved from end-to-end. The overall shape and size of the guiding projection 57 may be selected to urge the flow of working fluid in the combustion chamber in a manner that promotes combustion and/or exhaust processes. It is appreciated that the guiding projection 57 may be used on pistons like those illustrated in FIGS. 4A, 4B and 4C, or on other pistons of different (i.e., non-rectangular) shape, with or without depressions 23.

Figure 7F:
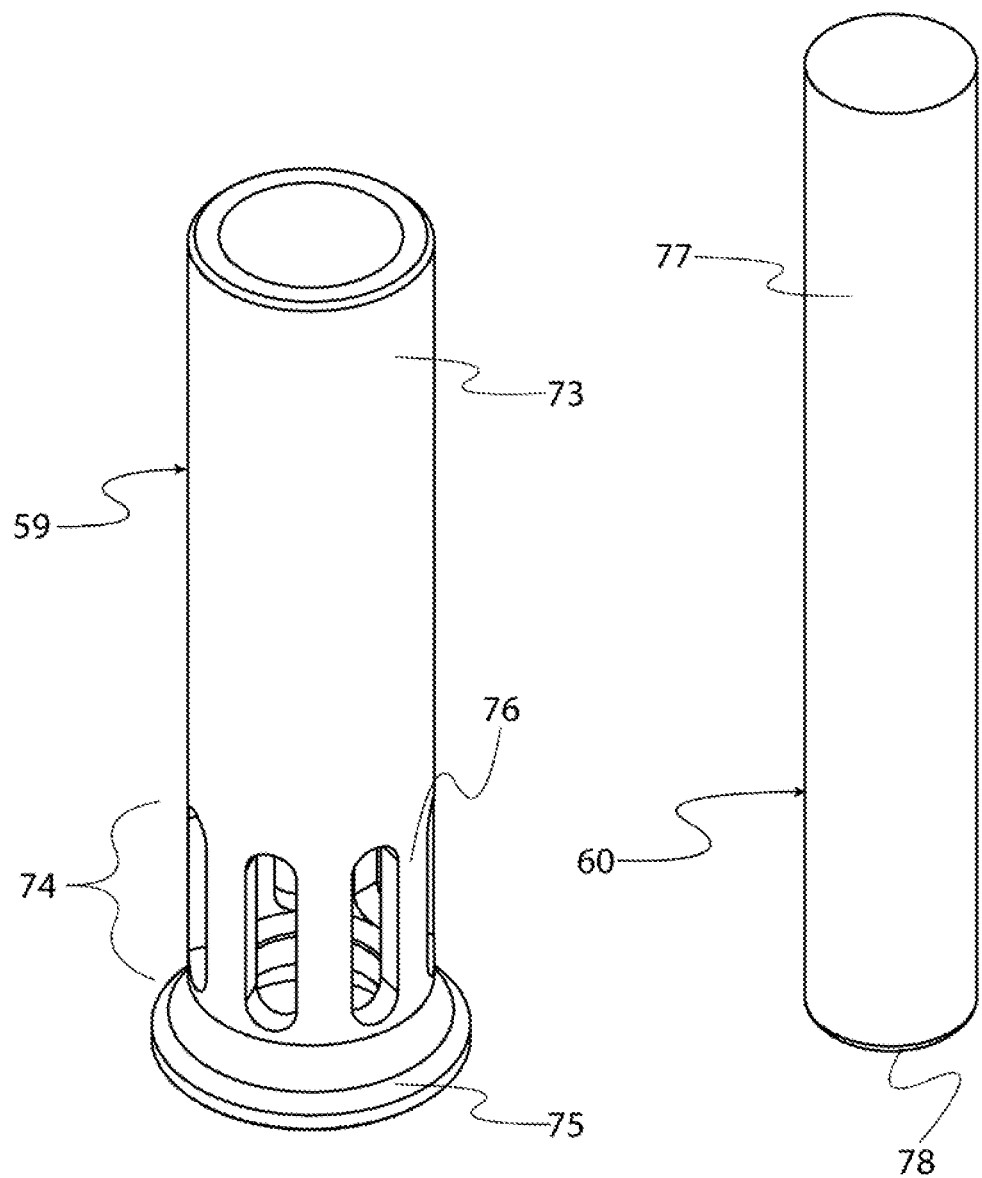
FIG. 7F is an isometric view of the separated outer and inner elements, respectively, of a multi-stage telescoping poppet valve in accordance with a fourth embodiment of the present invention.

A fourth engine embodiment of the present invention includes poppet valves of the type illustrated in FIGS. 7F, 7G, 7H and 7I, in which like elements from other embodiments are labeled with like reference characters. FIG. 7F shows the alternative multi-stage poppet valve also may include a cooperatively shaped and sized inner poppet valve 60 and an outer poppet valve 59. The outer poppet valve 59 may have a hollow upper stem 73, lower valve head/seat 75, and an intermediary cage body 74 that are formed together as a generally elongated hollow cylinder. The cage body 74 may include a plurality of fingers 76 that connect the hollow stem 73 to the lower valve head/seat 75. The lower valve head/seat 75 of the outer poppet valve 59 may have a port or opening 79 extending through it from a lower face to the cage body 74. The inner poppet valve 60 may have an upper stem 77 and lower valve head 78 formed as a uniform diameter cylinder.

Figure 7G:
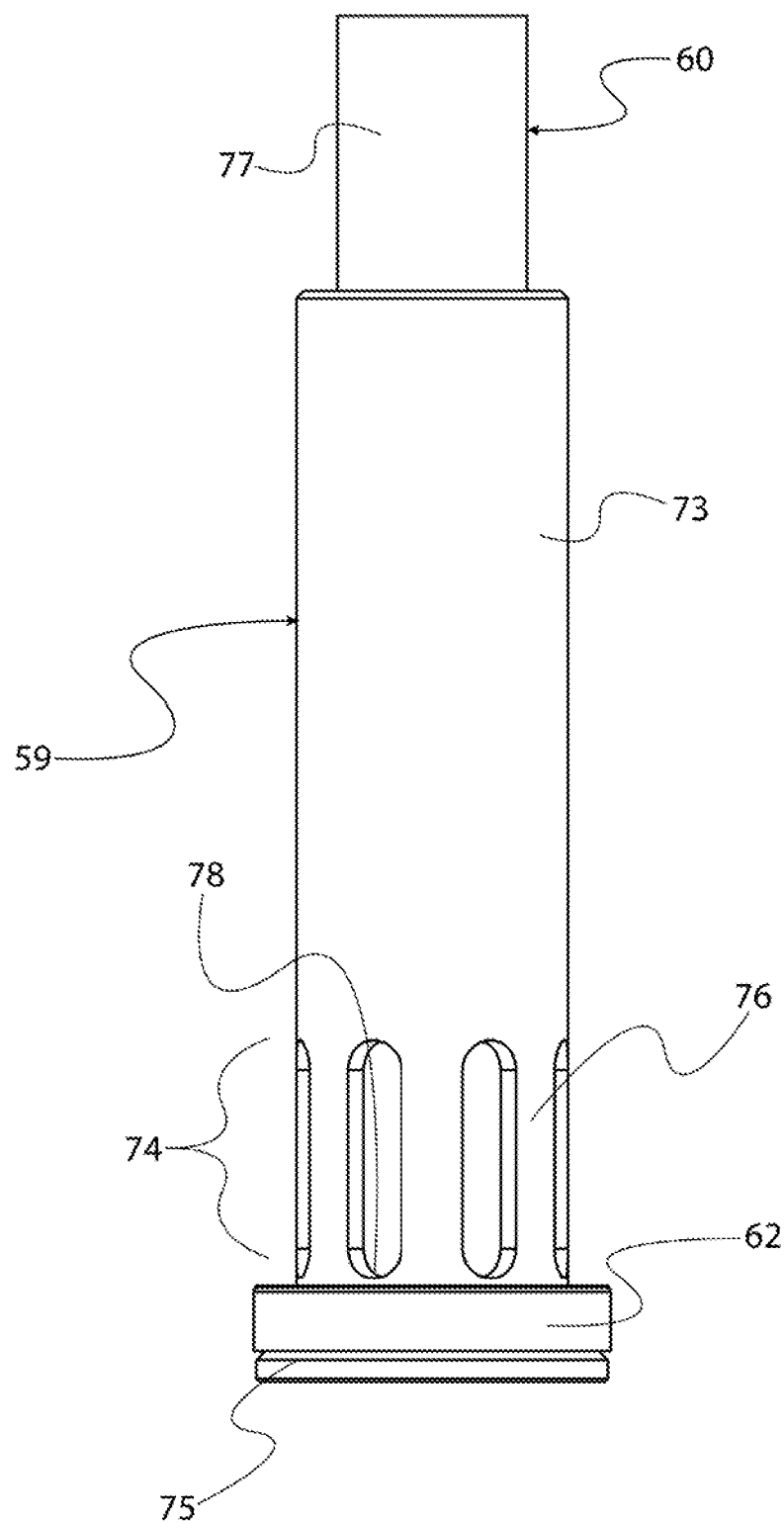
FIG. 7G is a side view of a multi-stage telescoping poppet valve constructed of outer and inner elements shown in FIG. 7F in a valve-closed position.
Figure 7H:
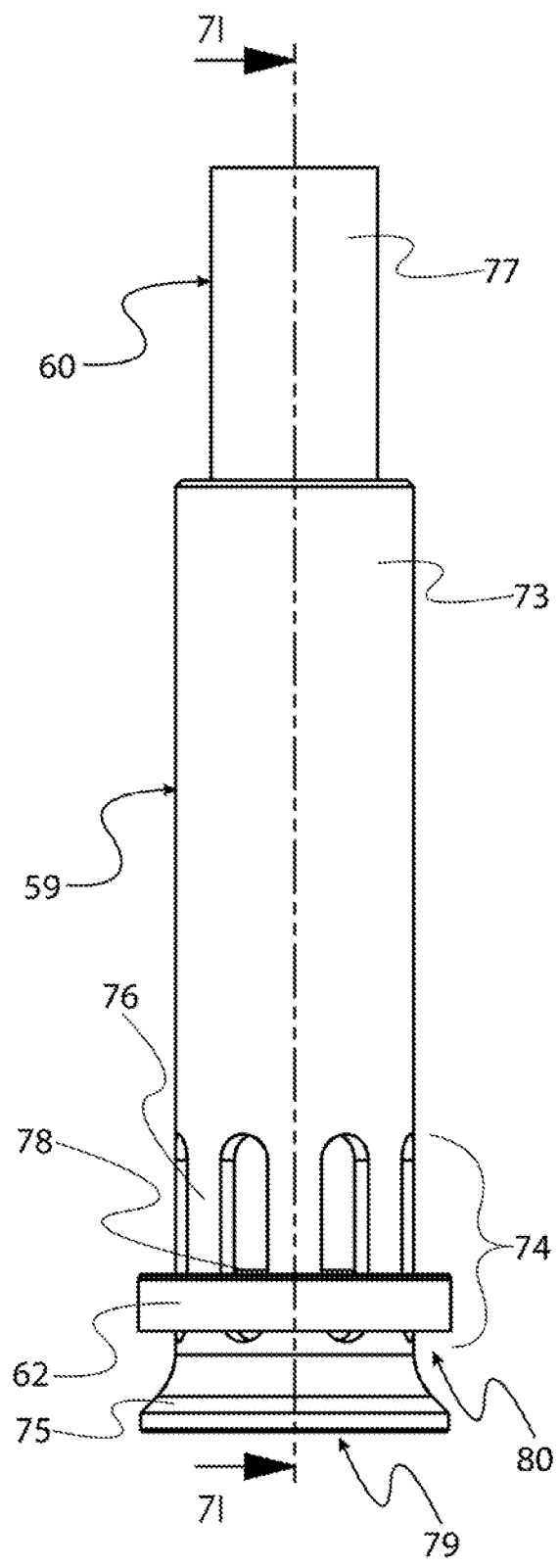
FIG. 7H is a side view of the multi-stage telescoping poppet valve of FIG. 7G in a valve-opened position.
Figure 7I:
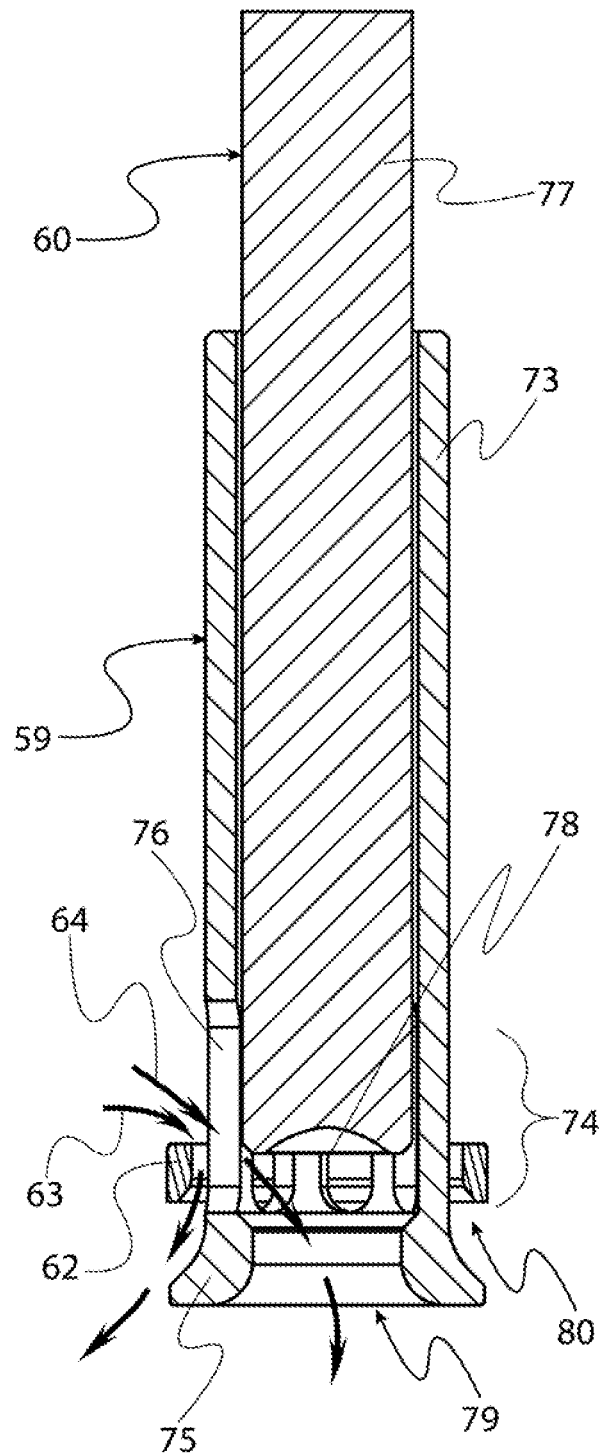
FIG. 7I is a cross-sectional view of the multi-stage telescoping poppet valve of FIG. 7H.

With reference to FIGS. 7G, 7H and 7I, the stem 77 of the inner poppet valve 60 is configured to slide securely within the hollow stem 73 of the outer poppet valve 59. The head 78 of the inner poppet valve 60 is configured to seal against the head/seat 75 of the outer poppet valve 59 to block the port 79 when the inner poppet valve is in a valve-closed position. The head/seat 75 of the outer poppet valve 59 is configured to seal against the valve seat (not shown) to block the outer poppet valve port when the outer poppet valve is in a valve-closed position. When the outer poppet valve 59 and inner poppet valve 60 are in valve-closed positions, the flow of working fluid through ports 79 and 80 is prevented. The outer poppet valve 59 encompasses the inner poppet valve 60 and the outer poppet valve head/seat 75 mates with a sealing surface on the inner poppet valve head 78. With reference to FIGS. 7H and 7I, the outer poppet valve 59 and the inner poppet valve 60 are shown in a valve-opened position for the passage of working fluid past the valve. Actuation of the outer poppet valve 59 causes the outer poppet valve to translate downward away from its valve seat, and (optional) actuation of the inner poppet valve 60 causes it to translate upward away from the outer poppet valve head/seat. These actuations, together or independently, permit working fluid to flow past the valve as the result of an outer flow 63 and/or an inner flow 64.

Figure 8B:
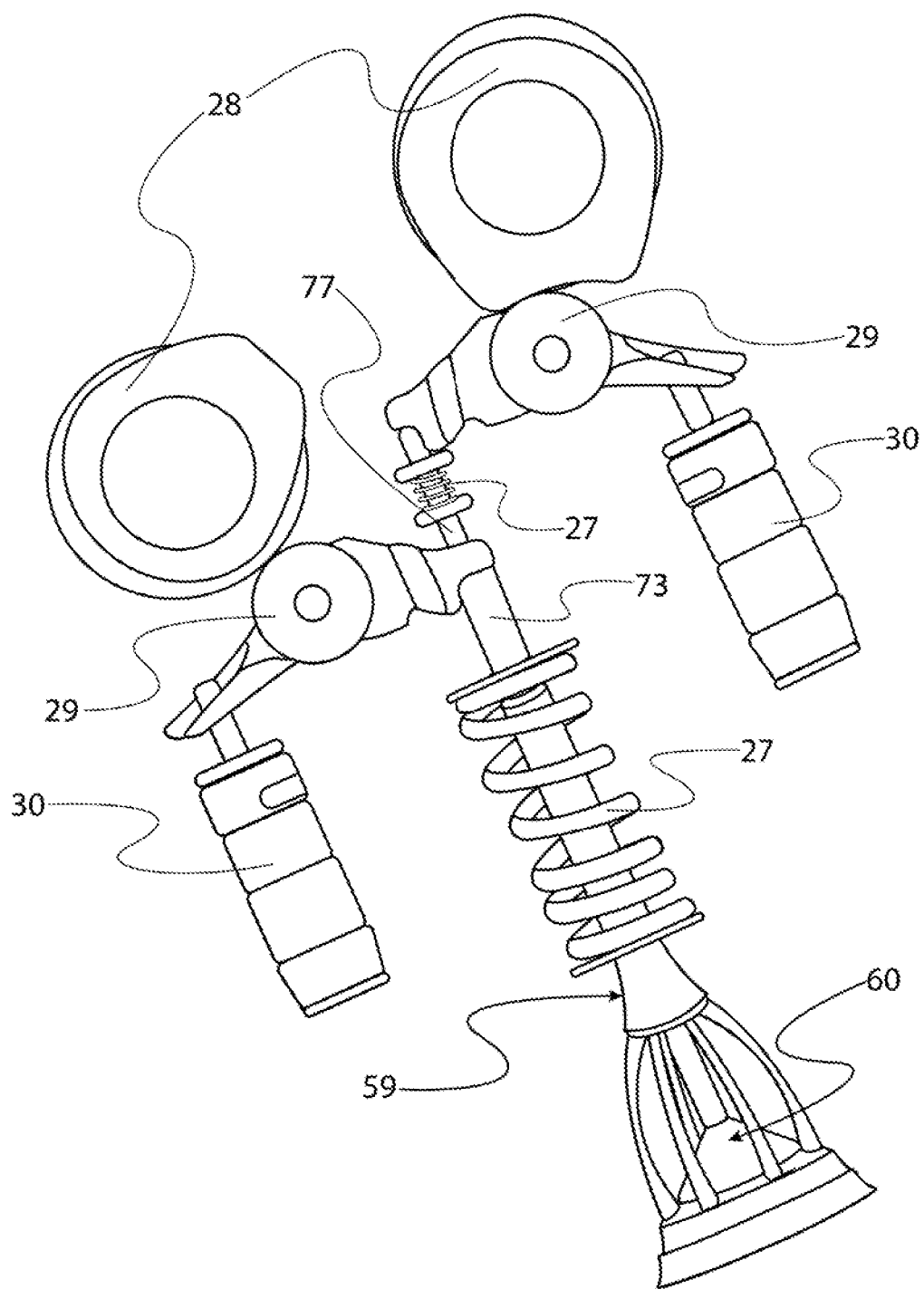
FIG. 8B is a side view of the poppet valve of FIGS. 7A-7E and a valve actuation system for the poppet valve in accordance with a fifth embodiment of the present invention.

A fifth engine embodiment of the present invention includes a valve actuation system illustrated in FIG. 8B. FIG. 8B shows an alternative example of a valve actuation system that may be used to actuate a multi-stage poppet valve having an outer poppet valve 59 and an inner poppet valve 60 in accordance with the first embodiment of the present invention. The valve actuation system in FIG. 8B differs from that of FIG. 8A in the following regard. In the FIG. 8B embodiment, the inner poppet valve 60, including its stem 77, is not held in a single fixed position, but is biased by a second valve spring 27 into a closed position. A second hydraulic lifter 30 for the inner poppet valve 60 is supported at a lower end by a fixed structure such as the cylinder head. The upper end of the second hydraulic lifter 30 may pivotally support the first end of a second cam follower 29. The cam follower 29 may contact a second cam 28 for actuation of the inner poppet valve 60. The end of the second cam follower 29 distal from the second lifter 30 may contact the inner poppet valve stem 77 such that downward motion of the second cam follower end pushes the inner poppet valve stem downward. The downward motion of the inner poppet valve 60 may be selectively set to match the downward motion of the outer poppet valve 59 to block the inner flow 64 (see FIG. 7C) in whole or in part during the downward motion of the outer poppet valve. Alternatively, the downward motion of the inner poppet valve 60 may act on the outer poppet valve 59 to push the outer poppet valve 59 open but keep the inner flow 64 blocked (see FIG. 7C). The position of the pivot point between the second lifter 30 and the second cam follower 29 relative to the second cam 28 may be adjusted during engine operation in the same manner as described above for the valve train components servicing the outer poppet valve 59.

Figure 8C:
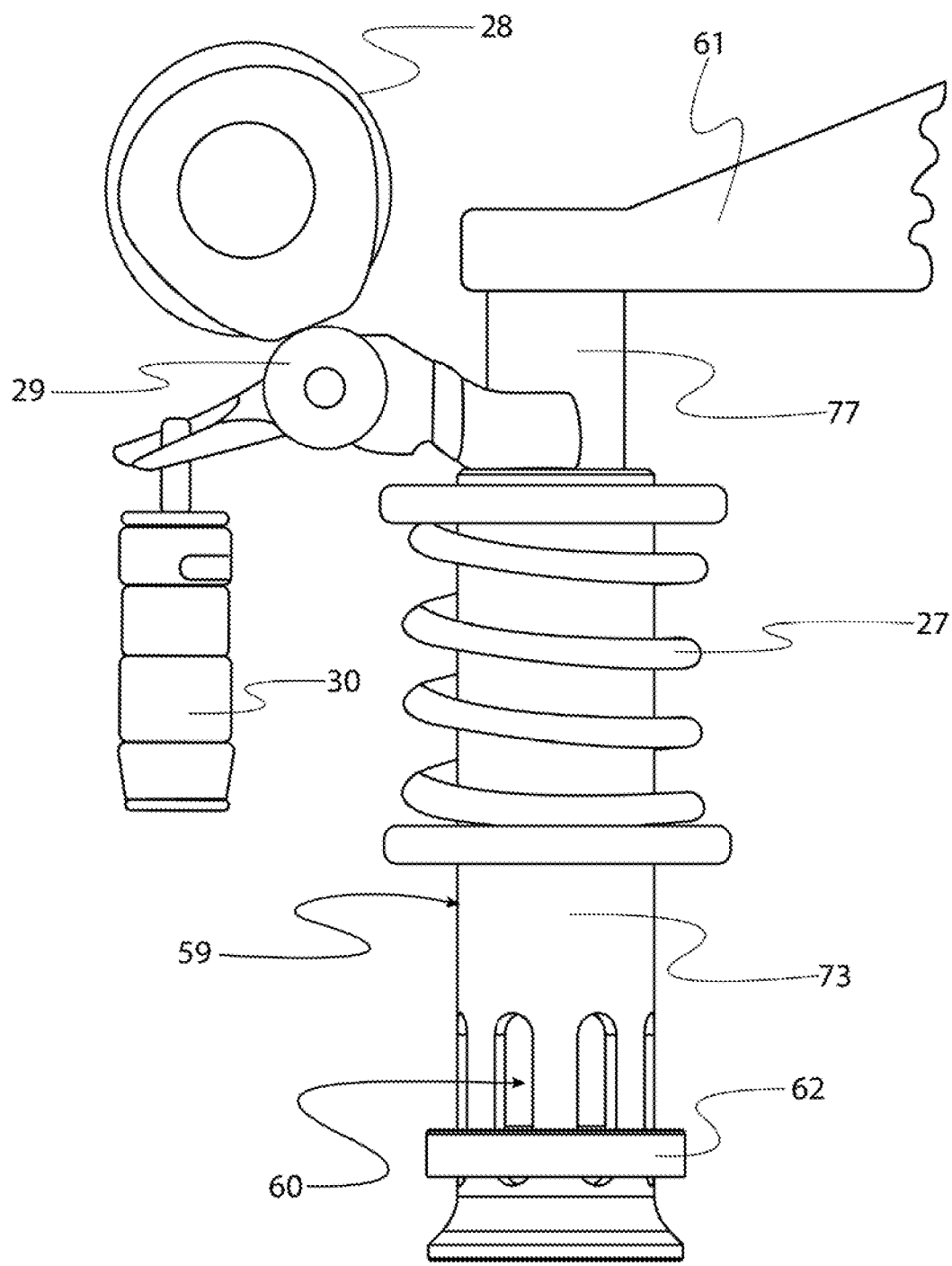
FIG. 8C is a side view of the valve actuation system of FIG. 8A used with a poppet valve of FIGS. 7F-7I.

FIG. 8C illustrates the use of the valve actuation system shown in FIG. 8A with the outer poppet valve 59 and inner poppet valve 60 assembly shown in FIGS. 7F-7I.

Figure 9:
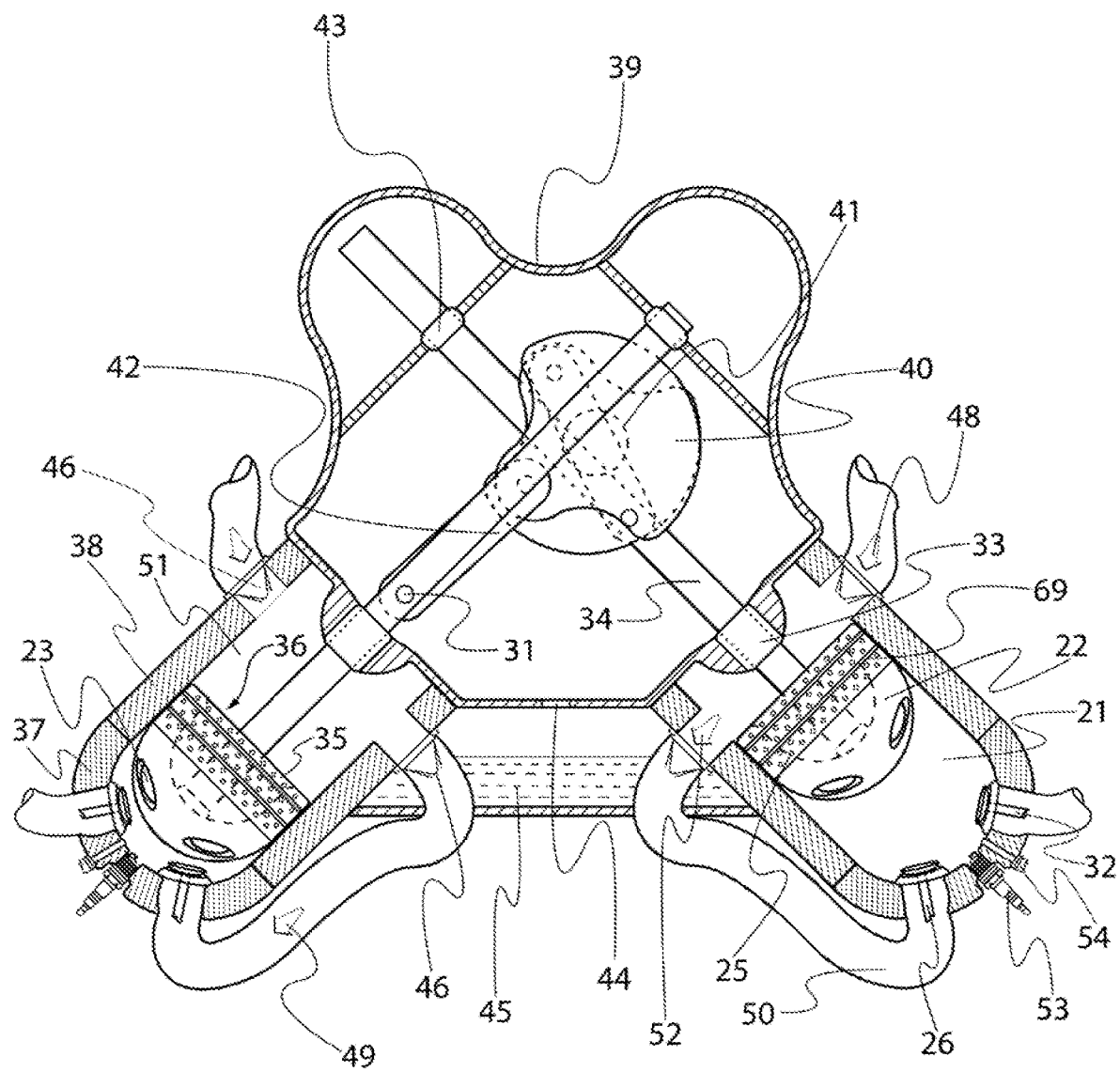
FIG. 9 is a side view of an inverted orientation internal combustion engine in accordance with a sixth embodiment of the present invention.

An internal combustion engine in accordance with a sixth embodiment of the present invention is shown in FIG. 9, in which like elements are labeled with like reference characters. FIG. 9 illustrates a V-banked engine with pistons 36 and other components of the type shown in FIG. 3 wherein the overall engine is "inverted" as compared with the engine shown in FIG. 3. An engine is considered to be inverted when it is oriented such that all engine pistons 36 in the engine have a piston head 22 with a location thereon that is continually closer to the center of gravity of the local gravitationally dominant body (e.g., Earth) than any location on the same piston's skirt 35 for a prolonged period of time. An inverted engine may also be defined as one in which the pistons are closer to the local gravitationally dominant body's center of gravity at top dead center position than at bottom dead center position during normal operation. For example, an engine provided in a wheeled vehicle is inverted if all of the engine pistons 36 have a piston head 22 with a location thereon that is continually closer to the center of gravity of the Earth than any location on the piston's skirt 35 while the vehicle is resting on level ground. In another example, an engine provided in an aircraft is inverted if the engine pistons 36 have a piston head 22 with a location thereon that is continually closer to the center of gravity of the Earth than any location on the piston's skirt 35 for the majority of the time that the aircraft is in flight.

The engine shown in FIG. 9 differs from that shown in FIG. 3 in the following regard. The engine of FIG. 9 includes an oil reservoir used to provide lubricant to the crankcase 39 which is located next to the inverted piston 36 cylinders. As a result, the intercooler 50 passes through the oil reservoir 45 which assists in cooling the working fluid within the intercooler.

Figure 10A:
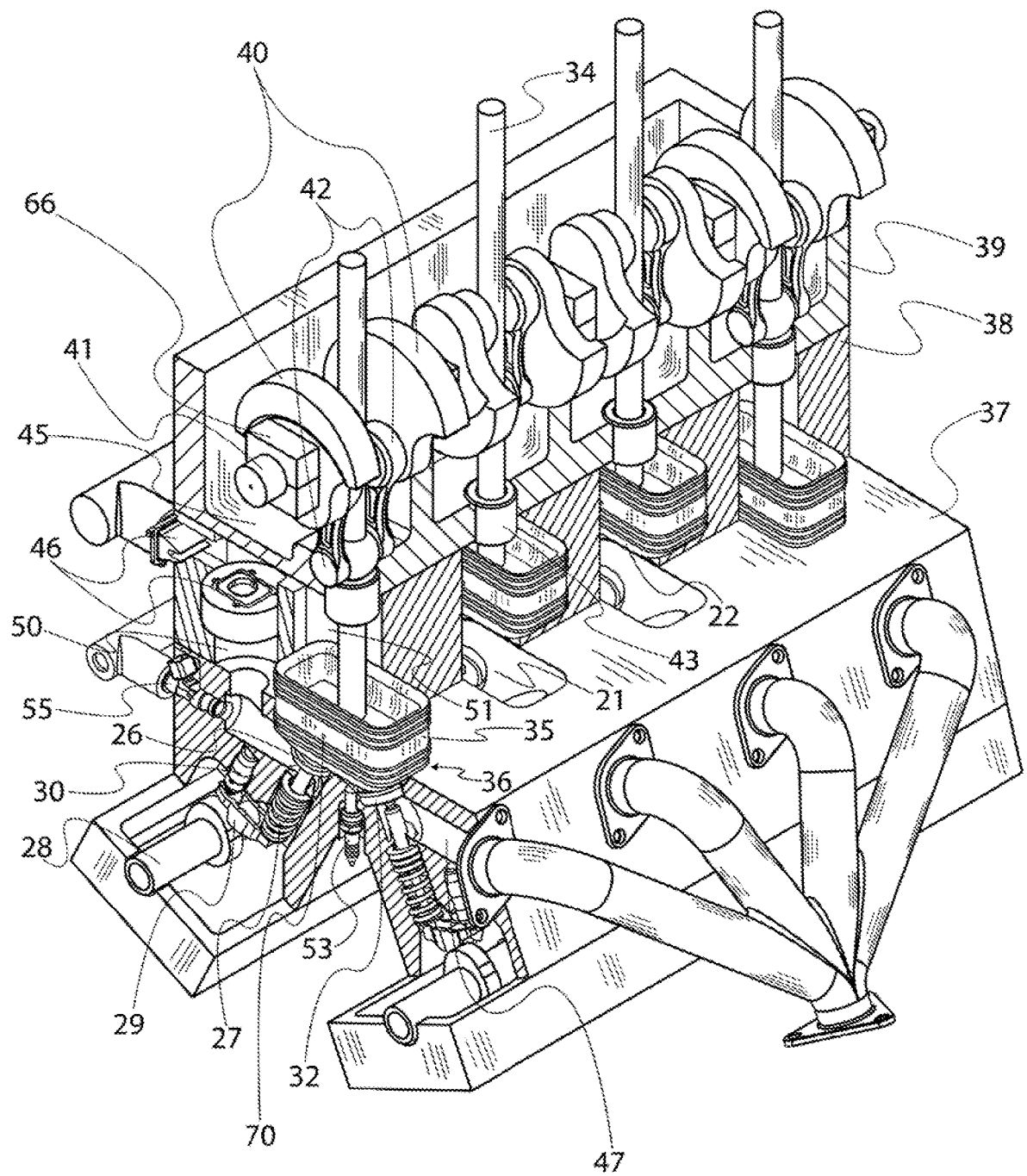
FIG. 10A is an isometric, partial cross-sectional, view of an inverted orientation internal combustion engine in accordance with a seventh embodiment of the present invention.
Figure 10B:
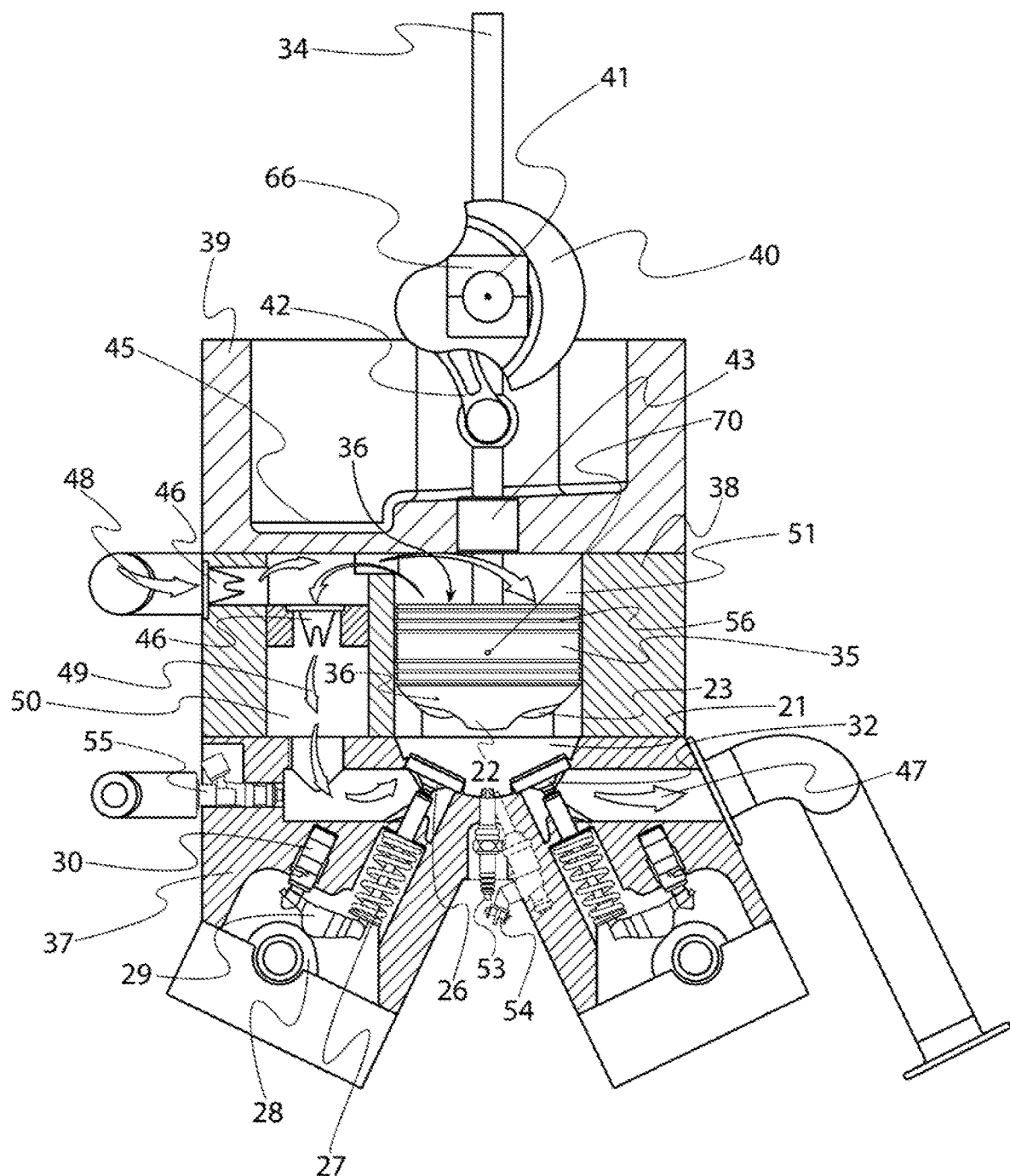
FIG. 10B is a cross-sectional end view of the internal combustion engine of FIG. 10A.
Figure 10C:
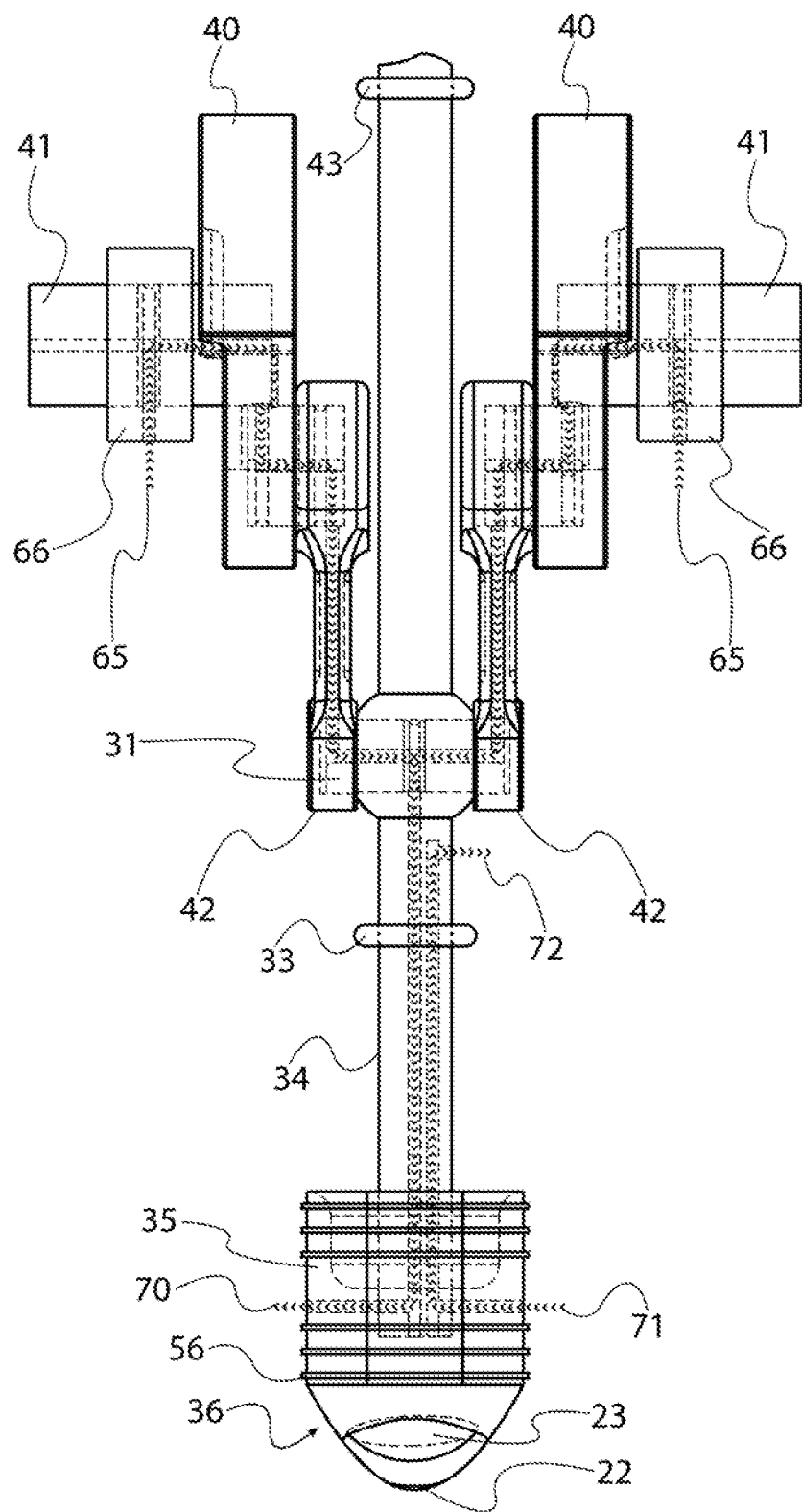
FIG. 10C is a side view of a lubricated engine piston and crankshaft arrangement shown in FIGS. 10A and 10B.
Figure 10D:
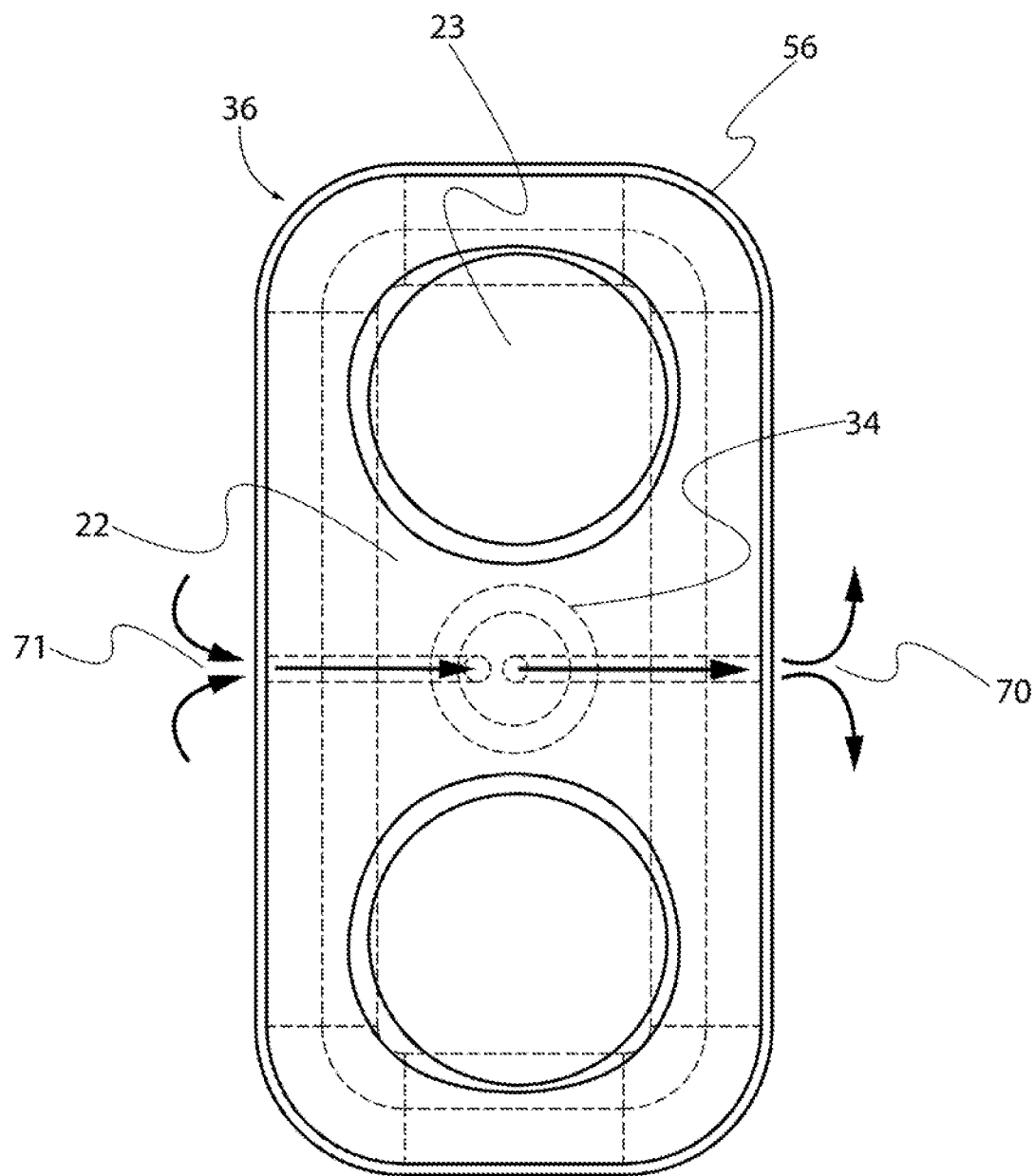
FIG. 10D is a top plan view of the engine piston shown in FIG. 10C.

An internal combustion engine in accordance with a seventh embodiment of the present invention is shown in FIGS. 10A and 10B, in which like elements are labeled with like reference characters. FIGS. 10A and 10B illustrate an alternative inverted engine. The FIGS. 10A and 10B engine differs from that shown in FIG. 9 in the following regard. The FIGS. 10A and 10B embodiment may use in-line engine pistons 36 and a split crankshaft assembly of the type described in connection with FIGS. 10C and 10D instead of ringless, non-lubricated pistons. In FIG. 10C, a crankshaft bearing 66 may be provided with an oil passage that receives pressurized oil from an oil source 65. The bearing 66 oil passage communicates with a chain of oil passages extending from the bearing through the split crankshaft 41, crank 40, connecting arm 42, wrist pin 31, cross-head 34, and piston skirt 35. The oil may flow through these passages to one or more bleed holes 70 provided on the surface of the piston skirt 35 between piston rings 56. Oil may be taken in from the surface of the piston skirt by return holes 71 extending through the piston skirt 35. Returned oil may spill from return port 72 into the crankcase to lubricate the split crankshaft assembly.

The FIGS. 10A and 10B engine may also use a modified supercharger chamber 51 to provide supercharging of the combustion chamber 21 with pressurized air/charge. In FIGS. 10A and 10B, the supercharger chamber 51 may be defined in part by a space between the piston skirt 35 and the upper cross-head guide 43, and also in part by a space adjacent to the piston cylinder. This adjacent space may comprise an intercooler, a pressurized reservoir or plenum, or both. One or more passages may connect the two spaces (space above the piston skirt 35 and adjacent space). The use of one or more connecting passages may limit the amount of lubricating oil that migrates from the piston skirt to the adjacent space from where it could enter the compression chamber 21.

As will be understood by those skilled in the art, the invention may be embodied in other specific forms without departing from the spirit or essential characteristics thereof. The elements described above are illustrative examples of one technique for implementing the invention. One skilled in the art will recognize that many other implementations are possible without departing from the intended scope of the present invention as recited in the claims. For example, embodiments of the invention may be used in engines that are 2-cycle, 4-cycle, or multi-cycle, and that utilize any type of fuel, such as gasoline, bio-gasoline, natural gas, propane, alcohol, bio-alcohol, diesel, bio-diesel, hydrogen, gasified carbonaceous, bio-mass, or blended fuels. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. An internal combustion engine comprising:
   an engine cylinder having a cylinder wall;
   a piston disposed in the engine cylinder, said piston having a skirt and a head;
   a combustion chamber adjacent to the piston head defined by the cylinder wall;
   a first cross-head guide disposed proximal to the piston;
   a second cross-head guide disposed distal from the piston;
   a cross-head connected to the piston, said cross-head extending between and slidably received by the first cross-head guide and the second cross-head guide;
   two connecting rods each having a first end pivotally connected to the cross-head, and a second end distal from the first end, wherein the two connecting rods are disposed on opposite sides of the cross-head and rigidly connected to each other;
   a first crank disposed in a crankcase and pivotally connected to the second end of a first of the two connecting rods;
   a second crank disposed in the crankcase and pivotally connected to the second end of a second of the two connecting rods;
   a first split crankshaft section connected to the first crank at a connection point;
   a second split crankshaft section connected to the second crank;

a plurality of crank keyholes formed in the first crank at the connection point;
a plurality of crankshaft keyholes formed in the first split crankshaft section at the connection point, said crankshaft keyholes each having a center axis that is offset from a center axis of said crankshaft at the connection point; and
a plurality of pins/keys disposed in and extending between the plurality of crank keyholes and the plurality of crankshaft keyholes, said pins/keys having a size, shape and material,
wherein said first crank is comprised of a single integral part and said second crank is comprised of a single integral part,
wherein the number of the pins/keys, the size of the pins/keys, the shape of the pins/keys and the material of the pins/keys are configured to cause the pins/keys to shear when the crankshaft is subjected to detrimental levels of acceleration, deceleration, non-circular motion, or over-limit torque,
wherein the pins/keys are configured to cause the crank and the crankshaft to disengage and prevent transmission of unacceptable forces to other components in the engine when the crankshaft is subjected to detrimental levels of acceleration, deceleration, non-circular motion, or over-limit torque.

2. The internal combustion engine of claim 1, wherein the engine cylinder has a generally rectangular cross-section with rounded corners, and wherein the piston has a generally rectangular cross-section with rounded corners.

3. The internal combustion engine of claim 2, wherein the piston head includes an upper dome.

4. The internal combustion engine of claim 1, further comprising a plurality of laterally spaced pockets arranged in a plurality of rows to form a field of pockets on but not extending through the piston skirt, or on but not extending through the engine cylinder, or on but not extending through both the piston skirt and the engine cylinder.

5. The internal combustion engine of claim 1, wherein the engine cylinder and piston are in an inverted orientation.

6. The internal combustion engine of claim 1, further comprising:
a supercharger chamber defined at least in part by a space between the piston skirt and the first cross-head guide;
a first opening in the supercharger chamber;
a second opening in the supercharger chamber;
a working fluid passage extending from the second opening to the combustion chamber;
a first one-way valve disposed in the first opening, said first one-way valve configured to permit flow from a source of fresh air into the supercharger chamber; and
a second one-way valve disposed in the second opening, said second one-way valve configured to permit flow from the supercharger chamber to the working fluid passage.

7. The internal combustion engine of claim 1, further comprising:
a first poppet valve disposed in the engine cylinder; and
a first depression formed in said piston head proximal to the first poppet valve,
wherein the first depression has a continuous, generally circular, side wall extending between an upper lip and a depression floor, and
wherein the first depression side wall is curved or ramped from the upper lip to the depression floor.

8. The internal combustion engine of claim 7, further comprising:
a second poppet valve disposed in the engine cylinder; and
a second depression formed in said piston head proximal to the second poppet valve,
wherein the second depression has a continuous, generally circular, side wall extending between an upper lip and a depression floor, and
wherein the second depression side wall is curved or ramped from the upper lip to the depression floor.

9. The internal combustion engine of claim 1, further comprising a poppet valve assembly including:
an outer poppet valve with a hollow stem, lower head, and intermediary cage connecting the hollow stem to the lower head; and
an inner poppet valve having a stem and a lower head, said inner poppet valve stem slidably disposed in the outer poppet valve hollow stem, and said inner poppet valve head movable within said outer poppet valve intermediary cage.

10. The internal combustion engine of claim 1, further comprising:
an oil reservoir connected to the crankcase by one or more drain passages,
wherein the cross-head includes a lower extension configured to agitate oil in the oil reservoir as a result of engine operation.

11. A method of using a split crankshaft to operate an internal combustion engine, comprising the steps of:
providing rotational motion to a split crankshaft that includes:
a cross-head connected to a piston;
two connecting rods each having a first end pivotally connected to the cross-head, and a second end distal from the first end, wherein the two connecting rods are disposed on opposite sides of the cross-head;
a first crank pivotally connected to the second end of a first of the two connecting rods;
a second crank pivotally connected to the second end of a second of the two connecting rods;
a first split crankshaft section connected to the first crank at a connection point;
a second split crankshaft section connected to the second crank;
a plurality of crank keyholes formed in the first crank at the connection point;
a plurality of crankshaft keyholes formed in the first split crankshaft section at the connection point, said crankshaft keyholes each having a center axis that is offset from a center axis of said crankshaft at the connection point; and
a plurality of pins/keys disposed in and extending between the plurality of crank keyholes and the plurality of crankshaft keyholes, said pins/keys having a size, shape and material,
wherein said first crank is comprised of a single integral part and said second crank is comprised of a single integral part,
wherein the number of the pins/keys, the size of the pins/keys, the shape of the pins/keys and the material of the pins/keys are configured to cause the pins/keys to shear when the crankshaft is subjected to detrimental levels of acceleration, deceleration, non-circular motion, or over-limit torque,
wherein the pins/keys are configured to cause the crank and the crankshaft to disengage and prevent transmission of unacceptable forces to other components in the engine when the crankshaft is subjected to detrimental levels of acceleration, deceleration, non-circular motion, or over-limit torque.

12. An internal combustion engine comprising:

a piston;

a cross-head connected to the piston;

two connecting rods each having a first end pivotally connected to the cross-head, and a second end distal from the first end, wherein the two connecting rods are disposed on opposite sides of the cross-head;

a first crank pivotally connected to the second end of a first of the two connecting rods;

a second crank pivotally connected to the second end of a second of the two connecting rods;

a first split crankshaft section connected to the first crank at a connection point;

a second split crankshaft section connected to the second crank;

a plurality of crank keyholes formed in the first crank at the connection point;

a plurality of crankshaft keyholes formed in the first split crankshaft section at the connection point, said crankshaft keyholes each having a center axis that is offset from a center axis of said crankshaft at the connection point; and a plurality of pins/keys disposed in and extending between the plurality of crank keyholes and the plurality of crankshaft keyholes, said pins/keys having a size, shape and material, wherein said first crank is comprised of a single integral part and said second crank is comprised of a single integral part, wherein the number of the pins/keys, the size of the pins/keys, the shape of the pins/keys and the material of the pins/keys are configured to cause the pins/keys to shear when the crankshaft is subjected to detrimental levels of acceleration, deceleration, non-circular motion, or over-limit torque, wherein the pins/keys are configured to cause the crank and the crankshaft to disengage and prevent transmission of unacceptable forces to other components in the engine when the crankshaft is subjected to detrimental levels of acceleration, deceleration, non-circular motion, or over-limit torque.

* * * * *